(12) United States Patent
Hershberger

(10) Patent No.: US 10,205,219 B2
(45) Date of Patent: Feb. 12, 2019

(54) RADIO TRANSMITTER SYSTEM AND METHOD

(71) Applicant: Continental Electronics Corp., Dallas, TX (US)

(72) Inventor: David Lee Hershberger, Nevada City, CA (US)

(73) Assignee: CONTINENTAL ELECTRONICS CORP., Dallas, TX (US)

( * ) Notice: Subject to any disclaimer, the term of this patent is extended or adjusted under 35 U.S.C. 154(b) by 0 days.

(21) Appl. No.: 15/414,777

(22) Filed: Jan. 25, 2017

(65) Prior Publication Data

US 2017/0256842 A1  Sep. 7, 2017

Related U.S. Application Data

(62) Division of application No. 15/061,288, filed on Mar. 4, 2016, now Pat. No. 9,571,132.

(51) Int. Cl.
| | |
|---|---|
| *H04B 1/02* | (2006.01) |
| *H01Q 1/24* | (2006.01) |
| *H04L 27/12* | (2006.01) |
| *H04B 1/04* | (2006.01) |
| *H01Q 7/00* | (2006.01) |
| *H01Q 21/22* | (2006.01) |

(52) U.S. Cl.
CPC ............... *H01Q 1/24* (2013.01); *H01Q 7/00* (2013.01); *H01Q 21/22* (2013.01); *H04B 1/0458* (2013.01); *H04L 27/12* (2013.01)

(58) Field of Classification Search
CPC ......... H04L 27/04; H04L 27/12; H04L 27/20; H04B 1/04; H03F 7/38
See application file for complete search history.

(56) References Cited

U.S. PATENT DOCUMENTS

| | | |
|---|---|---|
| 3,160,833 A | 12/1964 | Ludvigson et al. |
| 3,343,088 A | 9/1967 | Boykin |
| 8,355,460 B2 | 1/2013 | Dickey |
| 2002/0014993 A1 | 2/2002 | Turner |
| 2008/0117894 A1* | 5/2008 | McMorrow ............ H03F 3/217 370/359 |
| 2009/0021325 A1 | 1/2009 | Lee |

(Continued)

OTHER PUBLICATIONS

Wikipedia, "Double-tuned amplifier," US, <www.wikipedia.com>.
(Continued)

*Primary Examiner* — Tuan Pham
(74) *Attorney, Agent, or Firm* — Hauptman Ham, LLP

(57) ABSTRACT

A radio transmitter system includes: a transmitter for deriving a carrier frequency modulated by an input; an electrically short antenna system, and a matching network between the transmitter and antenna system. The matching network includes: a primary circuit responsive to the transmitter, a secondary circuit including the antenna system, and magnetic or capacitive coupling between the primary and secondary circuits. The magnetic coupling is an air core transformer having first and second windings respectively included in the primary and secondary circuits. The matching network has a voltage versus frequency response including at least two horns spaced from each other such that the matching network has a pass band approximately equal to the modulation bandwidth.

17 Claims, 21 Drawing Sheets

(56) References Cited

U.S. PATENT DOCUMENTS

2011/0287732 A1 11/2011 Kakuya
2013/0154783 A1* 6/2013 Kato .................. H01F 27/2804
336/200

OTHER PUBLICATIONS

Jacoby, Benjamin, PhD., "Walsh Functions: A Digital Fourier Series," US.
Tse, Michael, "Impedance Matching for High-Frequency Circuit Design Elective," Sep. 2003, US.
Terman, Frederick Emmons; et al., "Electronic and Radio Engineering," Fourth Edition, pp. 405-408, McGraw-Hill Book Company, Inc., New York, US, 1955.
Terman, Frederick Emmons; et al., "Electronic and Radio Engineering," Fourth Edition, pp. 1&63-74, McGraw-Hill Book Company, Inc., New York, US, 1955.
Lopez, A.R., "Double-Tuned Impedance Matching," Antennas and Propagation Magazine, IEEE vol. 54, Issue 2, pp. 109-116, Apr. 2012, IEEE, US.
Dazey, M.H.; et al., "High-Power Transportable VLF Transmitter Facility," Space Division Air Force Systems Command, Los Angeles, California, US, May 1982.
Dobbie, L.G., M.E.; Revised by Builder, G., et al., "Chapter 9, Tuned Circuits," pp. 407&414-421, US.

* cited by examiner

RADIO TRANSMITTER SYSTEM AND METHOD

RELATED APPLICATIONS

The present application is a Divisional of U.S. application Ser. No. 15/061,288, filed Mar. 4, 2016, now U.S. Pat. No. 9,571,132, issued Feb. 14, 2017, the disclosure of which is hereby incorporated by reference herein in its entirety.

FIELD OF INVENTION

The present invention relates generally to radio transmitter systems having antenna systems that are electrically short relative to a carrier frequency supplied to the antenna system, and more particularly to such a transmitter system including an impedance matching network having primary and secondary circuits that are magnetically or capacitively coupled. Another aspect of the invention relates to modifying existing transmitter systems of said type by inserting magnetic coupling between primary and secondary circuits of an impedance matching network of the transmitter system.

BACKGROUND

Data transmission using frequency shift keying (FSK) modulation of a radio frequency (RF) carrier wave is widely employed for transmitting digital data. A special case of spectrally efficient FSK is known as minimum shift keying (MSK). In MSK, two orthogonal signals represent the binary values 0 and 1. Typically a binary one is represented by a first frequency ($f_1$) and a binary zero is represented by a second frequency which equals $f_2$; the first and second frequencies have the same AC amplitude. Generators of MSK signals usually include an I-Q modulator having an input responsive to a binary data source and two mixers (that is, signal multipliers) responsive to orthogonal components of a carrier. The data rate of an MSK system is determined by the maximum frequency shift, i.e., frequency deviation, of the transmitted signal from the frequency of a carrier wave. To preserve the orthogonal nature of MSK, the peak to peak frequency deviation equals the bit data rate divided by 2. For example, a typical very low frequency (VLF; between 3 kHz and 30 kHz) system in MSK mode with a frequency deviation of +/−50 Hz (i.e. 100 Hz peak to peak deviation) has a data rate equal to 100×2=200 bits per second. Any increase or decrease in data rate of an MSK system requires a corresponding change in frequency deviation.

MSK is often used in systems having transmit antennas with restricted useful bandwidth (typically 1 dB or less) because MSK is spectrally efficient. The wavelength of the RF carrier frequency frequently used in the VLF band is typically in the range of 10 to 30 kilometers. It is impractical to build a transmitting antenna large enough to be a significant fraction of these wavelengths. The typical VLF antennas, e.g., the antennas at the stations operated by the United States Navy in Maine and Hawaii for underwater radio transmission to submarines, occupy about a thousand acres of land area and still are only a small fraction of a wavelength in height, despite having multiple transmitting towers that respectively have heights of 304 meters (997.5 feet) (about 0.03 wavelength at the lowest VLF frequency) and 458.1 meters (1503 feet). (about 0.046 wavelength at the lowest VLF frequency). The economics of land and construction costs put practical limits on the size of any high power VLF antenna; the tower in Maine radiates 1800 kilowatts of power at a frequency of 24.0 kHz, but cannot handle digital signals having a rate greater than 200 bits per second.

Based on the above, the useful bandwidth of a typical high power transmitter including a VLF antenna is much less than a typical transmitter having an antenna for higher frequency bands. The useful bandwidth of a typical transmitter including a VLF antenna is in the range of 25-100 Hz. The maximum data rate that can be transmitted by existing high power VLF transmitters is limited by the antenna system useful bandwidth of these transmitters.

One advantage of FSK and MSK is that the resulting RF signal has constant amplitude. Typical transmitter power levels for high power VLF transmitting stations are in the range of 100 kW to 2,000 kW. Therefore, high efficiency is a key requirement to minimize operational cost. Because the transmitted signal has a constant amplitude envelope it can be amplified by simple power amplifiers that operate in high efficiency modes, such as Class C or Class D. For this reason, all prior art high power VLF transmitters utilize these types of high efficiency amplifiers and are incapable of handling any other type of modulation such as AM.

FIG. 1 is a block diagram of a prior art high power VLF transmitter employing MSK modulation. The transmitter of FIG. 1 is responsive to binary data source 910 having an output which supplies a bi-level, non-return to zero (NRZ) signal to MSK generator 912 which is responsive to VLF carrier source 916 and derives a frequency coded output, i.e., a variable frequency output dependent on the binary values of the output of source 910. In response to source 910 deriving binary one and zero values, generator 912 respectively derives first and second frequencies having the same AC amplitude at the carrier frequency minus the deviation frequency, and the carrier frequency plus the deviation frequency.

The MSK output of generator 912 is supplied to transmitter 914. Transmitter 914 includes a high power, high efficiency amplifier, such as Class C vacuum tube amplifier 915 including a tuned circuit having a resonant frequency equal to the VLF carrier frequency, or Class D transistor amplifier 917 including a comparator for converting the RF input signal into a square wave, with provision to provide envelope modulation if necessary by changing the number of operating amplifiers on every RF cycle. Transmitter 914 also includes antenna impedance matching network 918, which is responsive to the output of the Class C or Class D amplifier, as appropriate.

If the data (or bit) rate of source 910 is relatively low, no greater than 200 bits per second in the installations in Maine and Hawaii, network 918, in turn, supplies an MSK signal having an envelope with constant amplitude to high power VLF electromagnetic wave antenna system 920. Under such circumstances, antenna system 920, such as the previously described antenna systems in Maine and Hawaii, emits a VLF band wave with modulation having a substantially constant amplitude envelope with modulation having a wave shape that is a substantial replica of the wave shape derived by MSK generator 912.

The total frequency response of the cascaded sub-elements of the transmitter system of FIG. 1 can be found by taking the convolution of the impulse response of each of the sub-elements. In the block diagram of FIG. 1, antenna system 920 and matching network 918 cause the transmitter system of FIG. 1, (as described to this point) to have an extremely narrow useful bandwidth. In the time domain, this narrow bandwidth causes errors in the transmitted waveform that increase rapidly with increasing data rate, particularly above 200 bits per second in the transmitters in Hawaii and Maine. The impulse responses of antenna system 920 and matching network 918 cause these errors in the time domain.

If the bit rate of source 910 is higher than a certain level, such as 200 bits per second, the components of transmitter 914 (as described to this point), matching network 918, and particularly antenna system 920 have frequency responses and group delay distortion (that is, an error in the relative time delay across the bandwidth of the antenna system 920 and the components ((as described to this point)), between the antenna system and the output of generator 912) that change the shape of the frequency modulated wave which MSK generator 912 derives so that the shape of the modulated wave emitted by antenna system 920 is not a replica of the wave that generator 912 derives. Transmitter 914 (as described to this point), matching network 918 and particularly antenna system 920 cannot accurately replicate the sidebands, especially the higher order sidebands, associated with accurate reproduction of the higher bit rate frequency modulated wave derived by MSK generator 912. (The reader will recall that a frequency modulated wave is theoretically represented by an infinite number of higher order terms having coefficients represented by Bessel functions.) Because the modulation wave emitted by antenna system 920 is not an accurate replica of the wave derived by generator 912, under these circumstances, the signal at a receiver responsive to the wave emitted by antenna system 920 does not accurately replicate the output of binary data source 910.

Systems of the type described above have the disadvantages noted above relating to low data rate and are massive, highly expensive structures occupying enormous areas. In addition, considerable stresses are exerted on antenna system 920 in response to transients in the modulated wave that matching network 918 supplies to the antenna system. For example, discharges sometimes occur across insulators of the antenna system, which insulators maintain components of the antenna system ungrounded.

Many of these disadvantages are overcome by the transmitter system disclosed in the commonly assigned U.S. Pat. No. 8,355,460 which, as illustrated in FIG. 1 hereof, includes arbitrary impulse response pre-corrector 922, comparator 924, least mean square (LMS) calculator 926, real component current detector 928 and delay element 930. Another difference between the prior art described above and the transmitter system of the '460 patent is that the MSK generator of the '460 patent is not responsive to the carrier source. Instead, in the '460 patent, the MSK generator derives a frequency coded signal at baseband and the transmitter is modified so it responds to a baseband output of pre-corrector 922 and carrier source 916 to derive a VLF or LF carrier with frequency and amplitude modulation. The modulation is an amplified replica of the shape of the input signal pre-corrector 922 supplies to transmitter 914. The construction and operation of elements 922, 924, 926 and 930 are described in detail in the '460 patent and need not be described herein, except to note that they cause the output of transmitter 914 to be amplitude modulated so the power radiated from antenna 920 is relatively constant for data rates of source 910 up to 600 bits per second.

While discrete components are illustrated in FIG. 1 for components 912, 914, 916, 922, 924, 926, and 930 for convenience and ease of explanation, it is to be understood that many or all of the operations performed by these discrete components, except those related to power amplification and power handling, can be and are preferably performed numerically, in a computer. For, example, carrier source 916 can derive the carrier as a series of relatively small steps by using a sum of Walsh functions approximating a modulated sine wave. If a Walsh function sum generator is employed, the steps are smoothed by a low pass filter (not shown), having a cut off frequency of about 1 megahertz, and that drives antenna matching network 918.

FIGS. 2 and 3 are equivalent circuit diagrams of the distributed impedances of typical VLF antenna systems, such as antenna system 920 or the antenna systems included in the transmitter systems described infra in connection with the detailed description of the present invention. Such antenna systems typically include two or three towers, each having a height of about 500 meters, with many umbrella wires. The antenna system is typically driven by a transmitter system having (1) an output of about 500 kW, and (2) radiation efficiency in the range of about 65 to 80 percent. The antenna systems have electrical lengths, at VLF, of about 0.03-0.048 wavelengths with a low radiation resistance and a high series capacitive reactance. Resonating the capacitance with a helix inductor, causes the transmitter to produce a voltage up to 250 kilovolts. Because the antenna system is electrically very short, it has a high reactance, making impedance matching of the antenna to the transmitter difficult and generally possible over only a relatively narrow bandwidth of 0.2 KHz, except that the transmitter disclosed in the '846 patent has a bandwidth of about 0.6 KHz.

The circuit diagram of FIG. 2 assumes that the equivalent circuit of antenna system 920 is a series circuit including 417.99 microhenry inductor 931, which represents the inductance of the antenna system, 72519.3 picofarad capacitor 932, which represents the capacitance of the antenna system, and 0.1030 ohm resistor 933, which represents the radiation resistance of antenna system 920 at 16 kHz, the carrier frequency of transmitter 914 associated with the matching networks of FIGS. 7, 10, 12 and 14. The antenna system 920 represented by the equivalent diagram of FIG. 2 also includes 440 picofarad shunt capacitor 937, which represents the capacitance of a bushing of antenna system 920, as represented by FIG. 2, and the series combination of 0.05 ohm resistor 938, which represents the resistance loss of the earth in the vicinity of the antenna system, and 0.03505 ohm resistor 939 which represents the antenna system loss due to factors other than those represented by resistors 933 and 938.

The foregoing component values are associated with the antenna systems of FIGS. 7, 10 and 12. The component values of the different antenna systems associated with the matching networks of FIGS. 14, 18, 20 and 22, as represented by the diagram of FIG. 2, are discussed infra.

The equivalent circuit diagram of antenna system 920 illustrated in FIG. 3, includes 167.5 microhenry inductor 934, which is connected in series with the parallel combination of 92400 picofarad capacitor 935 and 62000 ohm resistor 936. The 62000 value of resistor 936 represents the parallel-equivalent radiation resistance at 12 kHz of antenna system 920 in the parallel configuration of FIG. 3. The antenna system 920 represented by the equivalent diagram of FIG. 3 also includes 530 picofarad shunt capacitor 937, which represents the capacitance of a bushing of antenna system 920 as represented by FIG. 3, and the series combination of 0.077 ohm resistor 938, which represents the resistance loss of the earth in the vicinity of the antenna system, and 0.0652 ohm resistor 939 which represents the antenna system loss due to factors other than those represented by resistors 933 and 938. The antenna system of FIG. 3 is associated with the matching network of FIG. 16.

The radiation resistance of the prior art narrow band antenna systems can be and has been assumed to be constant as a function of frequency; such an assumption cannot be made with the wider band transmitter systems described supra in connection with the detailed description of the present invention.

FIG. 4 is a circuit diagram of a typical prior art impedance matching network of a typical VLF transmitter system, such as network 918 of FIG. 1. The voltage output of a Class D, high power amplifier 917 of transmitter 914 drives terminal 940 of the matching network. The voltage at terminal 940 is supplied to primary circuit 961 of the network, which primary circuit contains cascaded phase shifters 941 and 942, each of which is (1) a low pass filter for removing unwanted harmonics, and (2) a 90 degree phase shifter at the carrier frequency of the output of transmitter 914. Each of phase shifters 941 and 942 has a tee configuration so that phase shifter 941 includes series inductors 943 and half of inductor 944 and shunt capacitor 945, while phase shifter 942 includes the series combination of the other half of inductor 944 and inductor 946, as well as shunt capacitor 947.

The phase shifted voltage at terminal 948 of phase shifter 942 is applied to tap 949 of autotransformer 950. Autotransformer 950 includes variable inductor 951 between tap 949 and terminal 952, as well as fixed inductor 953 between tap 949 and terminal 954. The voltage at terminal 949 is applied to antenna system 920 by the series combination of fixed inductor 953, variable inductor 955 and fixed inductor 956. The inductance of inductor 955 is adjusted such that the series combination of inductors 953, 955 and 956 and the antenna system impedance, as represented by the components of either FIG. 2 or 3, is resonant to the carrier frequency of the output of transmitter 914. The resonant condition is a factor in causing the bandwidth of the transmitter system including the network of FIG. 4 to be narrow. Inductors 953, 955 and 956, as well as antenna 920, form a secondary circuit 963 of the matching network. Primary circuit 961 and secondary circuit 963 are coupled to each other by variable inductor 951, which provides shunt inductive coupling between the primary and secondary circuits 961 and 963.

FIG. 5 includes a response curve 957 of voltage amplitude (in dB) vs. frequency of a typical prior art impedance matching network, such as the network illustrated in FIG. 4. Response curve 957 includes two peak values, at the tops of horns 958 and 959 that are approximately equidistant from a center frequency (the transmitter carrier frequency). Response curve 957 closely resembles the response curve (voltage versus frequency response) of an overcoupled doubly tuned filter, i.e., a filter having two resonances at the frequencies of the horns. Response curve 957 has a center frequency of 21.0 kHz and horns 958 and 959, at about 20.69 kHz and 21.32 kHz, which horns have peak voltages about 22.5 dB above the center frequency voltage; the center frequency corresponds with the carrier frequency of transmitter 914. Thus the frequency difference between horns 958 and 959 is about 600 Hz and the ratio of the frequency difference of the horns to the carrier frequency is about 0.0286. The transmitter system of FIG. 1, in combination with the matching network of FIG. 4 is able to handle bit rates of source 910 up to about 300 bits per second that are coded in minimum shift keying or Gaussian minimum shift keying.

Phase shifters 941 and 942, in combination with inductors 951, 953, 955 and 956, form a reactive impedance matching network between the output of transmitter 914, at terminal 940, and antenna system 920. In addition, phase shifters 941 and 942 are a low pass filter that suppresses harmonics of the carrier frequency introduced by stepped sine wave formation of the carrier or a square wave carrier.

Variable inductor 951 provides shunt inductive coupling between (1) the output (at terminal 948) of primary circuit 961 including phase shifters 941 and 942, and (2) secondary circuit 963 including inductors 953, 955 and 956, as well as the impedances (resistance, inductance and capacitance) of antenna system 920. The coupling provided by inductor 951 is determined by the necessary impedance transformation between the output of transmitter 914, at terminal 940, and antenna system 920. Consequently, the frequency separation between horns 958 and 959 is essentially fixed and determined by the reactances of antenna system 920 and the impedance looking into phase shifter 941 that is presented to the output of transmitter 914. If it is desired to change the coupling between terminal 948 at the output of phase shifter 942 and antenna system 920 and thereby change the spacing between horns 958 and 959, the inductance of variable inductor 951 is changed. However, the change in inductance of inductor 951 must be accompanied by a change in the inductance of inductor 955 to maintain the center frequency of response 957 between horns 958 and 959 at the carrier frequency of transmitter 914. Changing the inductance of inductor 955 to maintain the same impedance detunes the matching network of FIG. 4. Therefore, coupling and bandwidth in the matching network are essentially fixed.

It is, accordingly, an object of the present invention to provide a new and improved transmitting system, particularly adapted to operate in the VLF range or the low-frequency (LF; from 30 kHz to 300 kHz) range, wherein the transmitter system has a relatively wide bandwidth.

Another object of the invention is to provide a new and improved transmitting system, particularly adapted to operate in the VLF range or the LF range, wherein a matching network of the transmitter system can be easily adjusted to efficiently handle different bandwidth signals.

A further object of the invention is to provide a new and improved transmitting system, particularly adapted to operate at LF or VLF, wherein a matching network of the transmitter system can be adjusted with a single step to efficiently handle different bandwidths.

An additional object of the invention is to provide a new and improved transmitting system, particularly adapted to operate at LF or VLF, wherein a matching network of the transmitter system has a voltage amplitude versus frequency response that resembles the response of an overcoupled doubly tuned network because it includes a pair of horns, and the spacing between the horns can be adjusted independently of the impedance transformation the matching network provides.

An added object of the invention is to provide a new and improved transmitting system, particularly adapted to operate at LF or VLF, wherein a matching network of the transmitter system enables such a transmitter system to have a greater bandwidth than prior art transmitter systems, and coupling between primary and secondary circuits of the matching network is easily adjusted and the coupling is independent of the matching network impedance ratio, that is, the ratio presented to the matching network input terminals by the output of the transmitter power amplifier to the impedance of the antenna system the matching network drives.

A still further object of the invention is to provide a method of modifying existing transmitting systems adapted to operate in the VLF or LF ranges, wherein coupling between primary and secondary circuits of a matching network of the transmitter system is modified to enable such transmitter systems to: (1) have a greater bandwidth, (2) be easily adjusted, and (3) be adjusted independently of the matching network impedance ratio, that is, the ratio of (a) the impedance presented to the matching network input terminals by the output of the transmitter power amplifier to (b) the impedance of the antenna system the matching network drives.

SUMMARY

In accordance with one aspect of the present invention, a radio transmitter system comprises: (1) a transmitter adapted to be responsive to an input for deriving a carrier frequency output wave modulated by the input, (2) an antenna system that is electrically short at the carrier frequency, and (3) an impedance matching network for coupling the transmitter output wave to the antenna system and for matching the output impedance of the transmitter to the antenna system impedance. The impedance matching network includes: (a) a primary circuit coupled to be responsive to the transmitter output wave and which includes a first set of impedance components, (b) a secondary circuit including the antenna system and a second set of impedance components, and (c) magnetic or capacitive coupling of the primary circuit to the secondary circuit. The magnetic coupling is an air core transformer arrangement having first and second transformer windings respectively included in the primary and secondary circuits. The capacitive coupling includes a capacitive arrangement having a first electrode connected to be responsive to a voltage of the primary circuit and a second electrode connected to supply a voltage to the secondary circuit. The coupling and impedance components of the primary and secondary circuits cause the matching network to have a voltage versus frequency response including at least two horns approximately symmetrically located on opposite sides of the carrier frequency. The spacing of the horns from each other is such that the matching network has a pass band approximately equal to the bandwidth of the modulation. (The term "approximately" means within 15%; the term "substantially equal" means within 2%.)

Because the transformer arrangement that provides the coupling between the primary and secondary circuits has an air core, the matching network stores a very small amount of energy to provide impedance transformation over a relatively large range of frequencies. This is in contrast to the prior art coupling arrangements that use energy storing reactive impedance components, such as shunt coupling inductor 951.

In certain embodiments, the primary and secondary circuits are resonant at the carrier frequency and the transformer arrangement is a single air core transformer having two coils for coupling the primary and secondary circuits directly to each other so the matching network has a doubly tuned, overcoupled voltage versus frequency response. Depending on the embodiment, the primary and secondary circuits are series and/or shunt resonant circuits.

In additional embodiments, the primary circuit includes two cascaded tee circuits having series connected inductors and shunt connected capacitors, each providing a 90 degree phase shift at the carrier frequency. The secondary circuit is resonant at the carrier frequency and includes series connected inductors. One of the inductors of the primary circuit and one of the inductors of the secondary circuit are respectively the first and second transformer windings. Preferably, the first and second transformer windings are coupled to each other only by the air core transformer.

In another embodiment, the matching network has a triply tuned overcoupled response and includes primary, secondary and tertiary resonant circuits each tuned to the carrier frequency. The three resonant circuits are coupled to each other by an air core transformer arrangement having two transformers, each having two windings (that is, coils) so that a first transformer couples the output voltage of the primary circuit to the tertiary circuit and a second transformer couples the output of the tertiary circuit to the secondary circuit.

In a further embodiment, the matching network has a quadruply tuned overcoupled response and includes primary, secondary, tertiary and quaternary resonant circuits each tuned to the carrier frequency. The four resonant circuits are coupled to each other by an air core transformer arrangement having three transformers, each having two windings (that is, coils) so that a first transformer couples the output voltage of the primary circuit to the tertiary circuit, a second transformer couples the output of the tertiary circuit to the quaternary circuit and the third transformer couples the output of the quaternary circuit to the secondary circuit.

Yet a further aspect of the invention relates to a radio transmitter system comprising (1) a transmitter adapted to be responsive to an input for deriving a carrier frequency output wave modulated by the input; (2) an antenna system that is electrically short at the carrier frequency; and (3) an impedance matching network for coupling the transmitter output wave to the antenna system and for matching the output impedance of the transmitter to the antenna system impedance. The impedance matching network is arranged to have a voltage versus frequency response including at least two horns on opposite sides of the carrier frequency. Each of the horns has a peak amplitude, wherein the peak amplitudes are spaced from each other by the bandwidth of the modulation on the carrier. The bandwidth of the modulation causes the antenna system to have a radiation resistance spread such that the antenna system radiation resistance monotonically increases from the lowest to the highest frequency of the frequency spread. The antenna system radiation resistance at the lowest frequency of the spread is substantially lower than the radiation resistance at the highest frequency of the spread, where radiation resistance is varies proportionally to frequency squared. The transmitter is arranged for compensating for the radiation resistance spread by causing the power the transmitter supplies to the antenna system at higher frequencies in the frequency spread to be greater than the power the transmitter supplies to the antenna system at lower frequencies in the spread.

Preferably, the transmitter is arranged so that the power radiated from the antenna system is substantially constant over the bandwidth of the modulation. The transmitter preferably provides the compensation in response to an indication of the amplitude of power radiated from the antenna system, wherein the indication of the amplitude of power radiated from the antenna system is preferably provided in response to an indication of the current flowing in the secondary circuit to the antenna system, as modified by a 6 dB per octave rising characteristic so that as the frequency of the current supplied by the transmitter to the antenna system increases the current derived by the transmitter decreases.

Another aspect of the invention relates to a method of modifying a matching network of a VLF or LF transmitter system having a transmitter for deriving a carrier frequency adapted to be modulated. The matching network has a primary circuit connected to be responsive to the modulated carrier frequency, wherein the primary circuit includes first and second cascaded 90 degree phase shifters at the carrier frequency. The first phase shifter is connected to be responsive to the transmitter and connected to drive the second phase shifter. The second phase shifter includes a first series inductor. The matching network also includes a secondary circuit resonant to the carrier frequency. The secondary circuit includes an electrically short antenna system and an inductor arrangement connected between the primary circuit and the antenna system. The inductor arrangement includes a second series inductor. The matching network also includes coupling of the primary circuit to the secondary circuit by a shunt coupling inductor connected between the primary and secondary circuits. The method comprises: magnetically coupling the primary circuit to the secondary circuit via an air core transformer arrangement having a first coil that is included in the primary circuit and a second coil that is included in the secondary circuit. The first coil is included in the primary circuit by modifying the first series inductor and the second coil is included in the secondary circuit by modifying the inductor arrangement. Preferably, the shunt coupling inductor is removed from the network so the first and second coils are not ohmically connected.

The above and still further objects, features and advantages of the present invention will become apparent upon consideration of the following detailed description of specific embodiments thereof, especially when taken in conjunction with the accompanying figures.

DETAILED DESCRIPTION OF FIGS. 6-23

Figure 1:
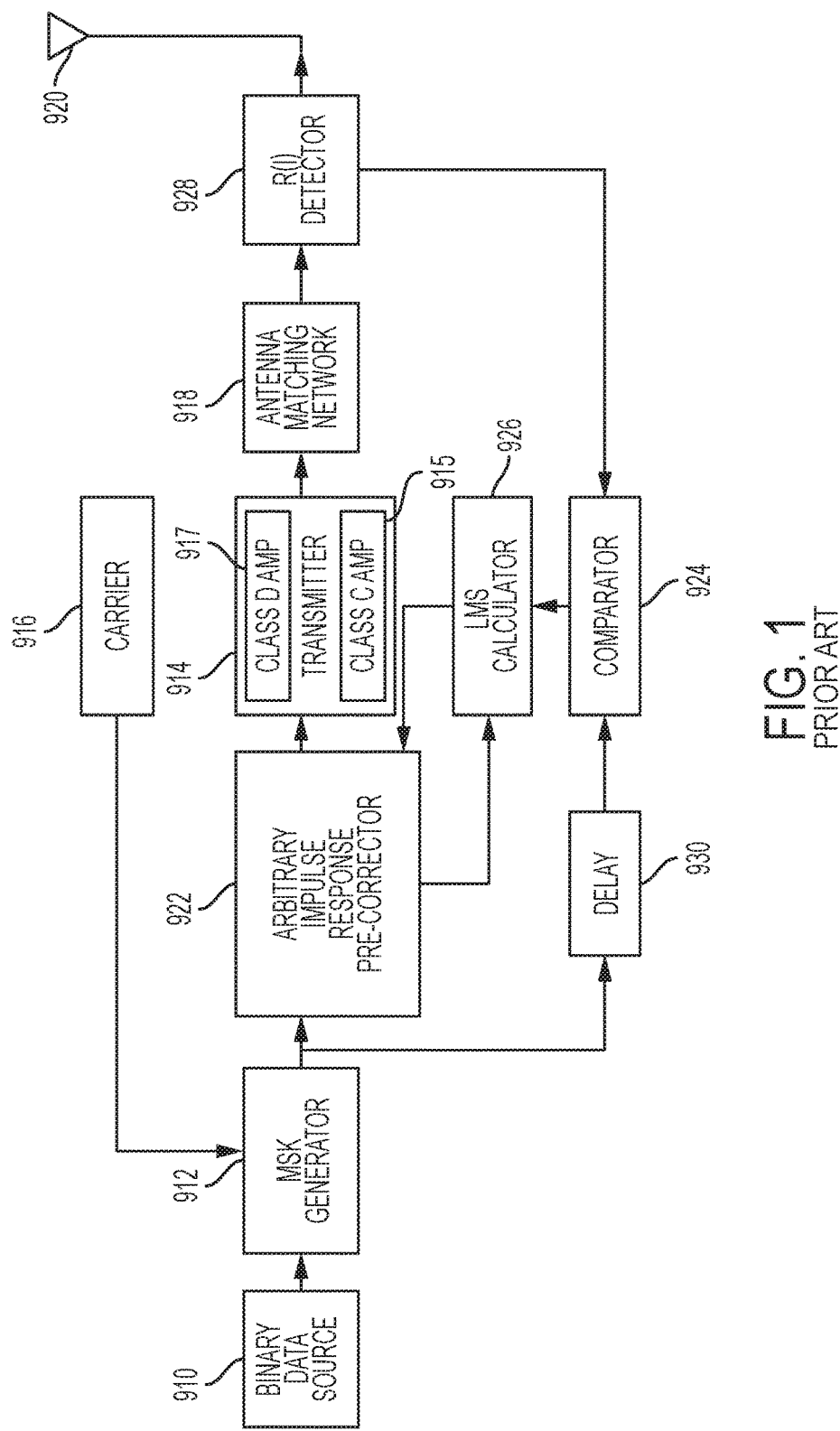
FIG. 1, as previously described, is a block diagram of a prior art high power LF or VLF transmitter system.
Figure 6:
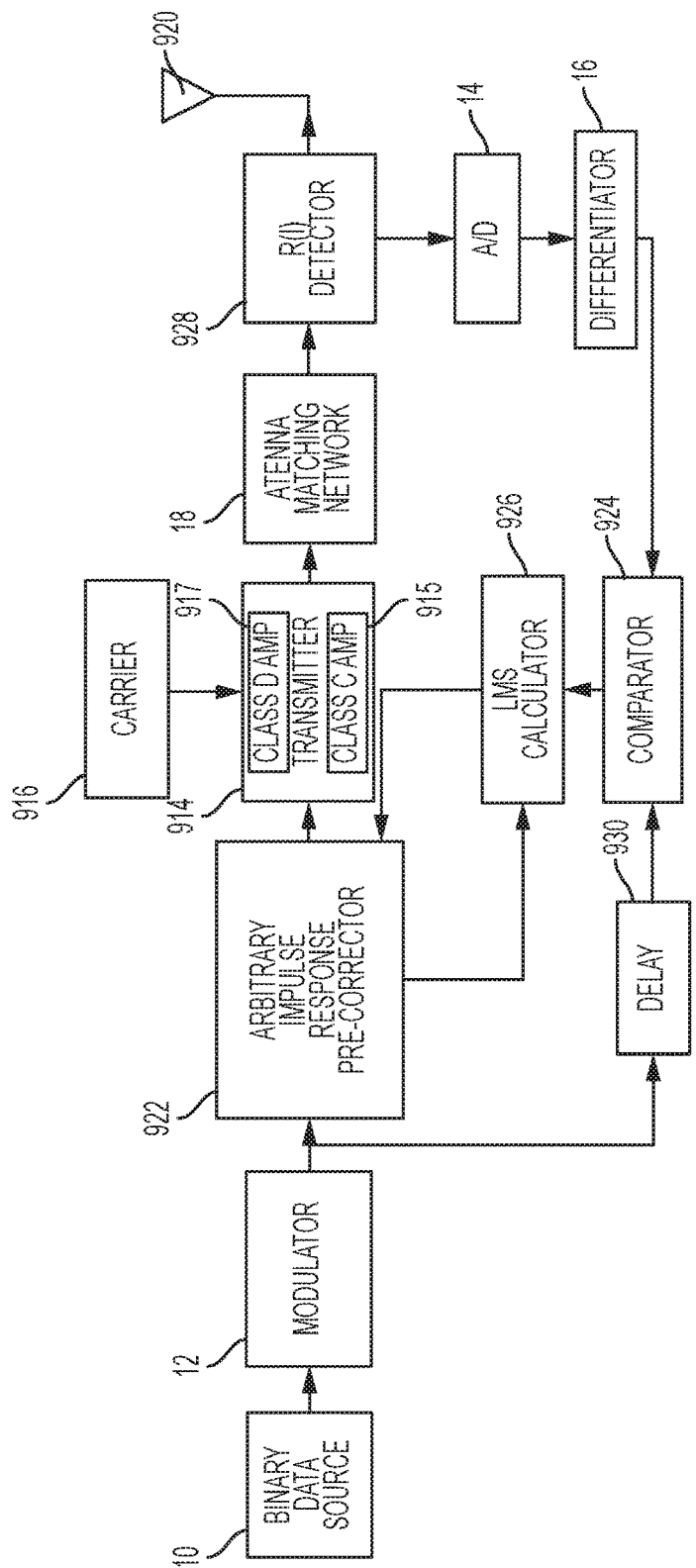
FIG. 6 is a block diagram of a VLF or LF transmitter in accordance with a preferred embodiment of the present invention.

FIG. 6, a block diagram of a preferred embodiment of a VLF or LF transmitter of the present invention, includes many of the same components as the prior art block diagram of FIG. 1, so that the components of the block diagrams of FIGS. 1 and 6 that are the same bear the same reference numerals and are not described again. The transmitter illustrated in FIG. 1 was described in connection with transmission of signals to submarines. The transmitter illustrated in FIG. 6, however, has broader applications due to its greater signal bandwidth which creates the opportunity to employ the transmitter of FIG. 6 for applications such as position finding, navigation and timing. In addition, the transmitter of FIG. 6 enables use of a lower portion of the VLF spectrum (for example, between 3 kHz and 15 kHz) that is presently unused.

To these ends, binary data source 910 and minimum shift key generator 912 of FIG. 1 are replaced in FIG. 6 by binary data source 10 and modulator 12. While binary data source 10 and modulator 12 can have the same configurations as source 910 and MSK generator 912, they can also have additional configurations for handling modulation types such as coded orthogonal frequency division multiplexing (COFDM), code division multiple access (CDMA) and Chirp.

Carrier frequency source 916 in the transmitter of FIG. 6 can derive a square wave at the carrier frequency or a stair step output. The square wave carrier is smoothed by cascaded phase shifters 941 and 942 of the matching networks of FIGS. 7, 10 and 12, while the stair step carrier is used with the matching networks of FIGS. 14, 16, 18, 20 and 22. A Walsh function generator can be used in source 916 to derive the carrier as a stepped approximation to a sine wave. The stair step carrier is smoothed by a low pass filter (not shown) having a cutoff frequency of at least one megahertz to prevent coupling of harmonics to antenna matching network 18.

Because the transmitter of FIG. 6 can have a relatively wide bandwidth, there can be a significant change in the radiation resistance of antenna system 920 between the lowest and highest frequencies of the wide bandwidth. For electrically short monopole antenna system 920, the radiation resistance is proportional to frequency squared. For example, if the frequency of carrier 916 is 12 kHz and the bandwidth to carrier frequency ratio of the transmitter is 8%, the spectrum radiated from antenna system 920 extends from 11.52 to 12.48 kHz. At 12.48 kHz the radiation resistance of the antenna system 920 is approximately 1.174 times the radiation resistance at 11.52 kHz. For constant current of the antenna system 920, this change in the radiation resistance of antenna system 920 produces a slope of approximately 0.7 dB across the bandwidth of the transmitted signal. Thus, the antenna system has a monotonic increase in radiation resistance from the lowest to the highest frequency in the radiated spectrum.

An effective way to correct the change in the radiation resistance of antenna system 920 across the bandwidth of the transmitted signal is to incorporate a correction for the radiation resistance change in the adaptive equalization system including arbitrary impulse response pre-corrector 922, comparator 924 and least mean square calculator 926. The wideband transmitter system of FIG. 6 uses linear equalization to correct for amplitude response and group delay of antenna system 920. This correction is adaptive, to correct for slowly varying parameters, such as temperature, antenna ice, and varying ground conductivity. The adaptive equalization system of FIG. 6 responds to an indication of the current supplied to antenna system 920, as derived by current detector 928.

The indication of the antenna current derived by detector 928 is, in the prior art of FIG. 1, compared to an ideal reference signal derived from delay element 930, causing the equalizer including components 922, 924 at 926 to be adjusted, so the current of the antenna system 920 is proportional to the ideal reference signal. For the wideband situation of the transmitter system of FIG. 6, the frequency squared variation of antenna radiation resistance has an appreciable effect on the power of the electromagnetic wave radiated from antenna system 920. If the current of the antenna system remains constant over the wide frequency band of the transmitter system of FIG. 6 there would be a rising slope proportional to frequency in the power of the electromagnetic wave radiated by the antenna system.

To overcome the problems associated with the radiation resistance increase of antenna system 920 for the wideband transmitter system of FIG. 6, the indication of antenna system current derived by current detector 928 is supplied to analog to digital converter 14, which supplies a digital indication of the antenna system current to differentiator 16. Differentiator 16 has a 6 dB per octave rising characteristic, matching the radiation resistance increase of antenna system 920. Consequently, differentiator 16 supplies a signal to comparator 924 that is indicative of the power of the electromagnetic wave transmitted by antenna system 920, rather than a signal proportional to antenna current. Differentiator 16 must be used in combination with the equalizer if the ratio of the transmitter bandwidth to carrier frequency is 0.04 or more; the differentiator can be used for any bandwidth and can improve performance if the equalizer is not used and the ratio is considerably less than 0.04.

The equalizer including components 922, 924 and 926 has a complementary response to the output of differentiator 16, to attenuate the higher transmitted frequencies to a greater extent than the lower transmitted frequencies, resulting in a flat response in the power radiated from antenna system 920. Because the equalizer has a complementary response to the output of differentiator 16, the equalizer causes the current that transmitter 914 supplies to matching network 18 to have a shape that is the inverse of that of the differentiator, i. e, an integrated current that decreases as frequency increases. The integrated current, which increases in magnitude as frequency increases, supplied by matching network 918 to antenna system 920 helps to cause, the power radiated from the antenna system to be constant.

The most significant difference between the transmitters of FIGS. 1 and 6 concerns the replacement of antenna matching network 918 with wideband antenna matching network 18, which can have any of the configurations illustrated in FIGS. 7, 10, 12, 14, 16, 18, 20 and 22, and overcomes, in certain instances, all of the aforementioned problems associated with matching network 918 and in other instances some problems associated with matching network 918.

Figure 4:
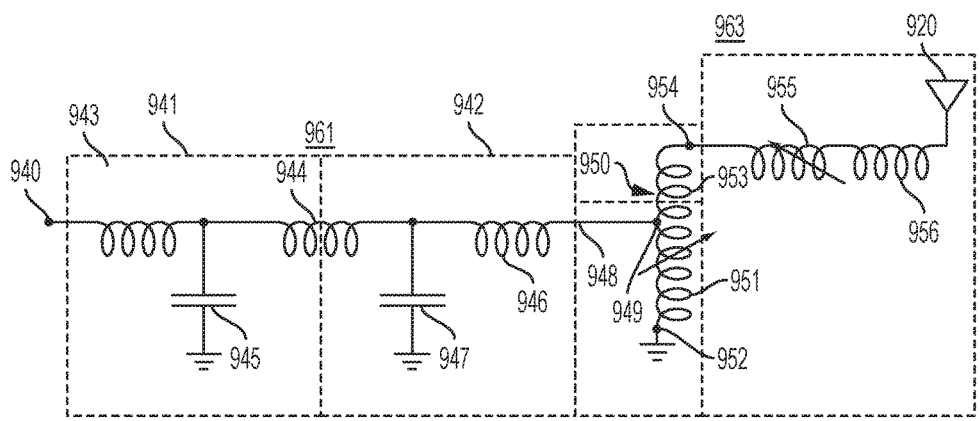
FIG. 4, as previously described, is a circuit diagram of a typical prior art matching network.
Figure 5:
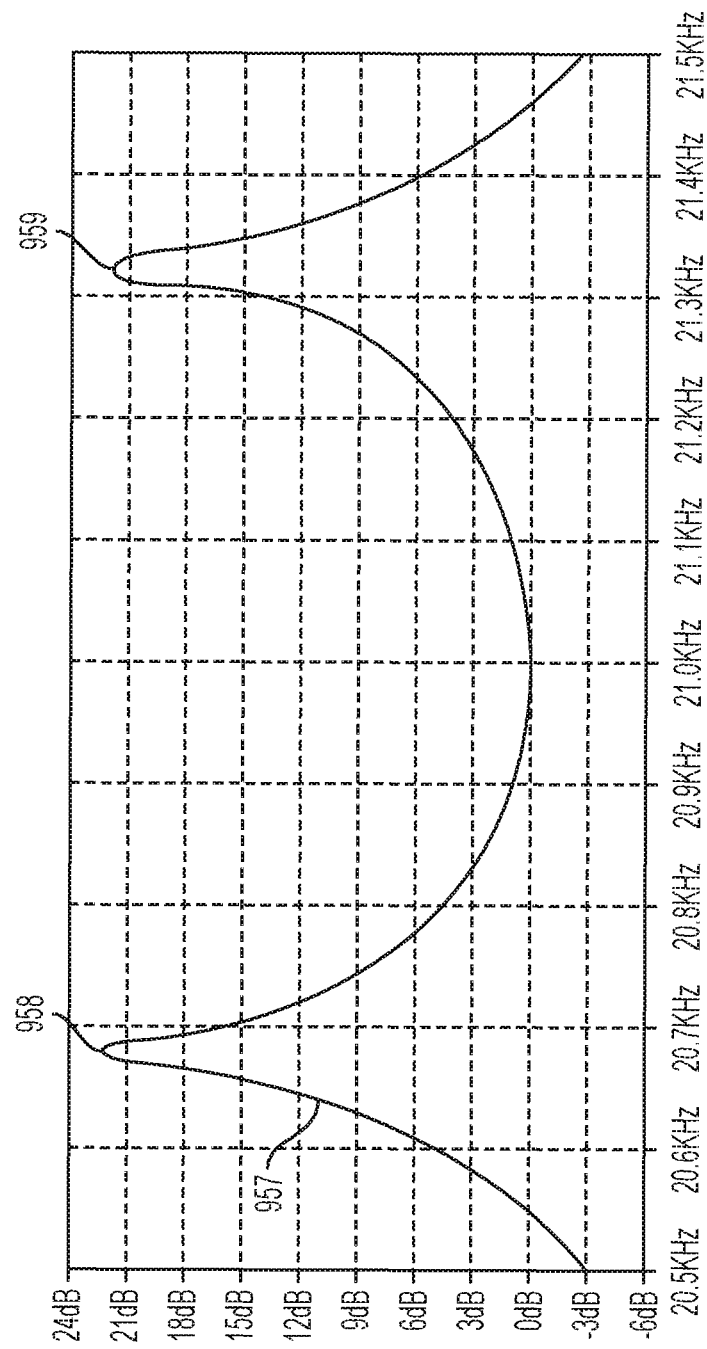
FIG. 5, as previously described, includes a response curve of voltage amplitude versus frequency of a typical prior art impedance matching network.
Figure 7:
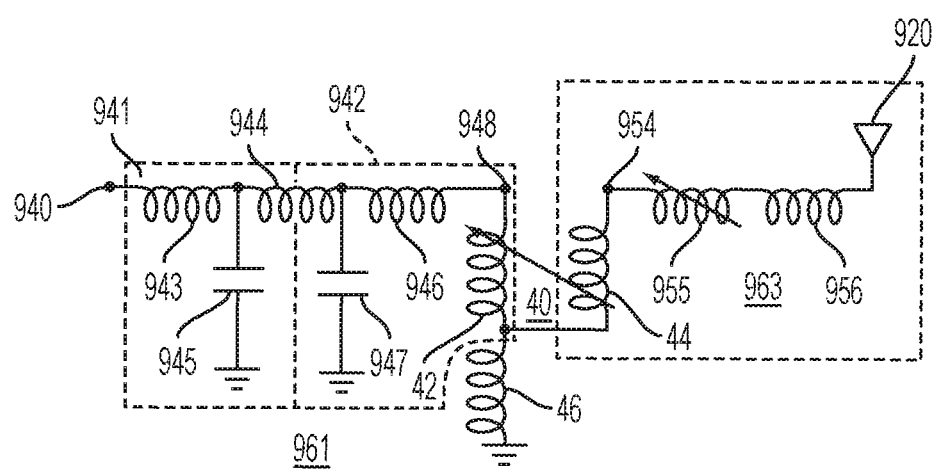
FIG. 7 is a circuit diagram of a matching network according to a first embodiment of the present invention, wherein the network of FIG. 7 is a variation of the network of FIG. 4.
Figure 10:
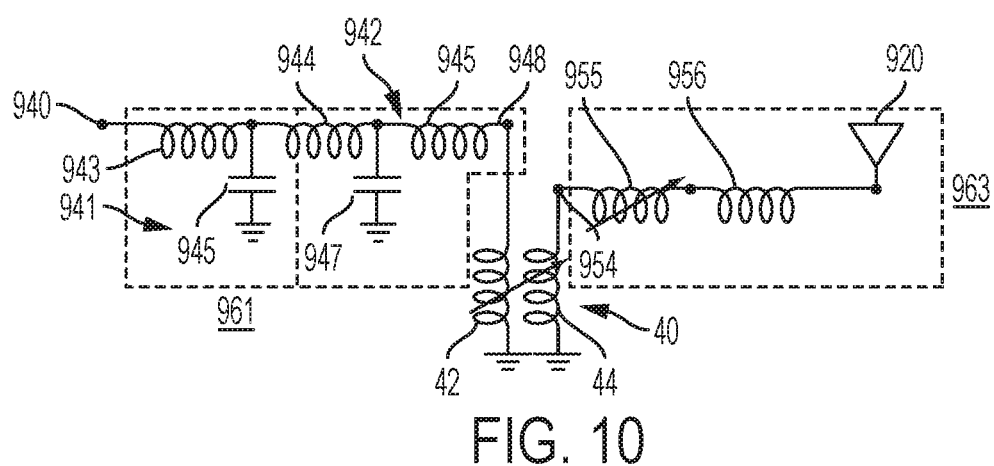
FIG. 10 is a circuit diagram of a matching network according to a second embodiment of the present invention, wherein the network of FIG. 10 is a further variation of the network of FIG. 4.
Figure 12:
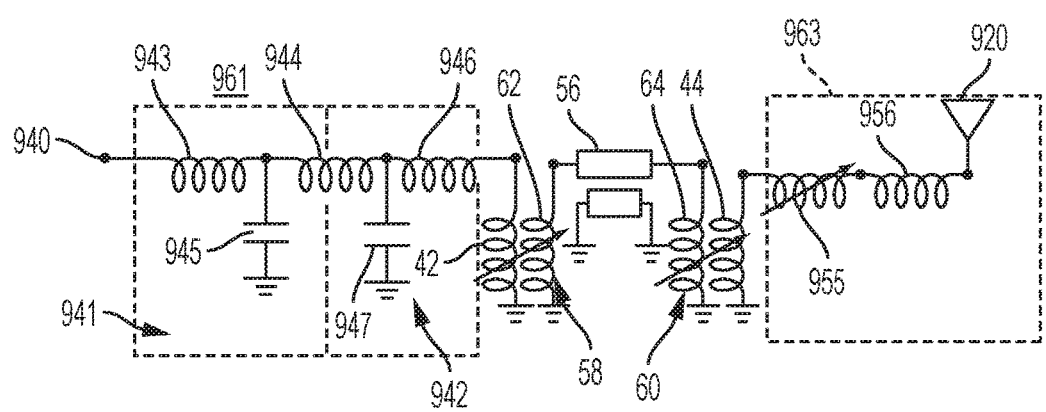
FIG. 12 is a circuit diagram of a matching network according to a third embodiment of the present invention, wherein the network of FIG. 12 is another variation of the network of FIG. 4.

The matching networks of FIGS. 7, 10 and 12 are similar to the prior art network 918 of FIG. 4 in that all of them include (1) a primary circuit 961 having two cascaded 90 degree phase shifters 941 and 942, (2) a secondary circuit 963 including inductors 953, 955 and 956, as well as antenna 920, and (3) a coupler. Matching networks 918 of existing transmitters of the type discussed in connection with FIG. 1 can easily be modified so they are configured in accordance with the networks of any of FIG. 7, 10 or 12 by making only a few changes to networks 918. The secondary circuits of the matching networks of FIGS. 7, 10, 12, 14, 16, 18, 20 and 22 include current detector 926 (not shown in these figures) for monitoring the current supplied to antenna system 920.

Figure 8:
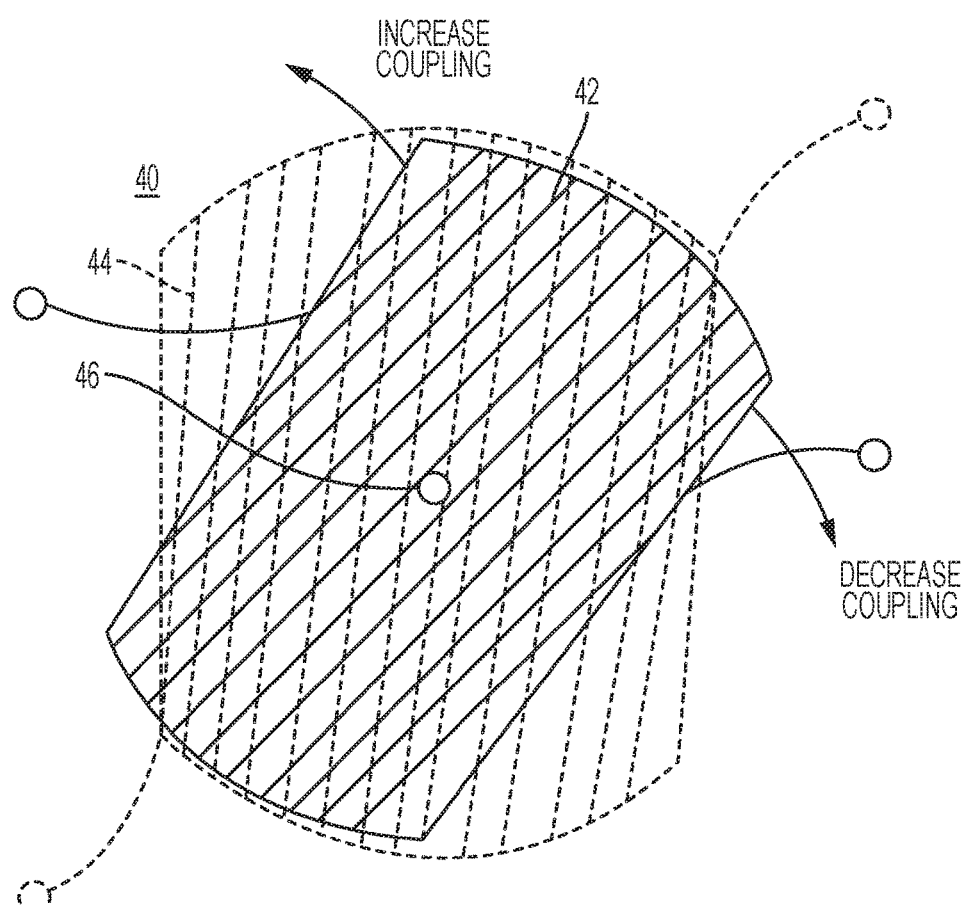
FIG. 8 is a front view of a variocoupler preferably employed in the matching network of FIG. 7 and other matching networks in other embodiments of the present invention.

The couplers between primary and secondary circuits 961 and 963 in the matching networks of FIGS. 7, 10 and 12, as well as in the matching networks of FIGS. 14, 16, 18 and 20, include an air core transformer arrangement, preferably including variocoupler 40, illustrated in FIG. 8 as including spherical coils 42 and 44, having a common center point 46. Coil 42 is rotatable about center point 46 and is located inside fixed coil 44. Coils 42 and 44 have turns of the same pitch that are inductively, that is magnetically, coupled to each other. Coils 42 and 44 can provide variable coupling coefficients between primary and secondary circuits 961 and 963 from nearly zero to nearly one; the coefficient is close to zero when the turns of coil 42 are at right angles to the turns of coil 44 and close to one when the turns of coils 42 and 44 are parallel to each other. In the matching networks of FIGS. 7, 10 and 12, the typical coupling coefficient is usually about 0.4 (such that the turns of coil 42 are about 40 degrees from the turns of coil 44) to provide a feasible compromise between wide bandwidth and amplitude response for the transmitter.

An advantage of variocoupler 40 is that coupling coefficient changes have no effect on the resistance or inductance of transformer coils 42 and 44. Consequently, changes in coupling coefficient do not change the impedances of the primary or secondary circuits or the couplers of the matching networks of FIG. 7, 10, 12, 14, 16, 18, or 20. Thus, bandwidth changes can be made without affecting tuning of antenna system 920 to the output of transmitter 18. This is in contrast to the matching network of FIG. 4, where bandwidth changes resulting from changing the value of coupling inductor 951 affect the tuning the matching network presents to the output of transmitter 914. Thus, if it is desired to change the transmitter system bandwidth in a transmitter system including the network of FIG. 4, it is necessary to alter the values of at least some of the matching network components to obtain the correct impedance and tuning that the matching network presents to transmitter 914.

Variable inductor 955 in the matching networks of each of FIGS. 7, 10, 12, 14, 16, 18, 20 and 22 is preferably a variometer or helical coil. The variometer includes two coils which are the same as coils 42 and 44, except that one end of coil 42 is ohmically connected to one end of coil 44 and the other ends of coils 42 and 44 are connected to terminals of elements in series with the variable inductor; e.g., if the variable inductor is a variometer, one end of coil 42 is connected to terminal 954, one end of coil 44 is connected to inductor 956 and the remaining ends of coils 42 and 44 are connected together. In a variocoupler the ends of coils 42 and 44 are not ohmically connected to each other, unless the circuitry associated with the variocoupler requires such a connection. The use of a variometer for each of inductors 955 is advantageous because changing the inductance of the variometer, by turning the winding of one coil relative to the other coil, changes only the inductance between the terminals of coils 42 and 46 that are not connected to each other, without changing the resistance between these terminals. A further advantage of variocouplers and variometers is that they have no rolling sliding or rolling contacts which can cause problems in handling the high amperage currents (e.g., 1000 amperes or more) flowing through the matching networks of FIGS. 7, 10, 12, 14, 16, 18, 20 and 22. A similar result can be obtained by changing the pitch of a helical coil.

The coupler included in the matching network of FIG. 7, in addition to including magnetic coupling between primary circuit 961 and secondary circuit 963 that is provided by variocoupler 40, includes fixed inductor 46. Inductor 46 provides shunt inductive coupling between primary circuit 961 and secondary circuit 963 because one end of each of coils 42 and 44 of variocoupler 40 and one terminal of inductor 46 are ohmically connected and the other terminal of inductor 46 is connected to ground. The other ends of coils 42 and 44 are respectively connected to terminals 948 and 954 of primary circuit 961 and secondary circuit 963.

Figure 9:
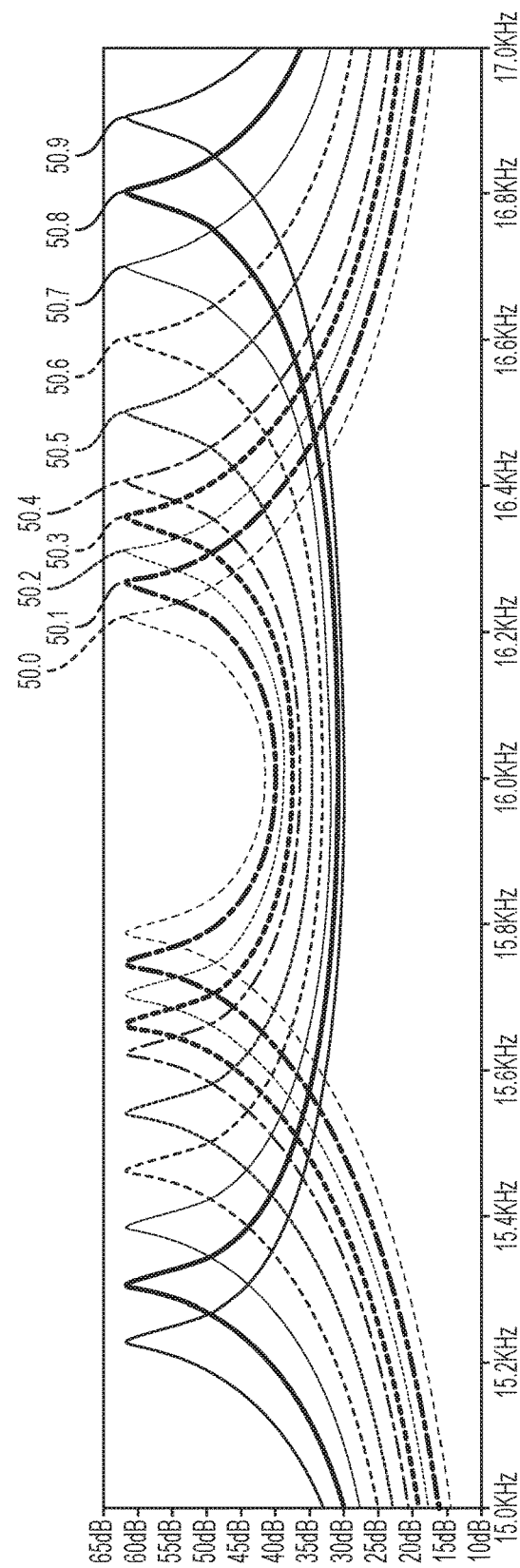
FIG. 9 includes a series of amplitude versus frequency response curves of the matching network of FIG. 7, for differing coupling coefficients of an air core transformer arrangement of FIG. 7.

FIG. 9 includes a series of amplitude (in dB) versus frequency response curves 50.0, 50.1, 50.2, 50.3, 50.4, 50.5, 50.6, 50.7, 50.8, and 50.9 for different coupling coefficients of variocoupler 40 of FIG. 7; the variocoupler coefficients are respectively 0, 0.025, 0.05, 0.075, 0.1, 0, 15, 0.2, 0.25, 0.3, 0.35 and 0.4. Each of response curves 50.0-50.9 has a similar shape, including two equal amplitude horns (peak values) equidistant from a nadir of the response curve, which is at the frequency of carrier source 916. As the values of the coupling coefficients increase, the separation between the horns of each response curve increases, with a corresponding increase in the bandwidth of the transmitter system. The frequency separations between the horns of many of the curves of FIG. 9 are such that the antenna system radiation resistance increases substantially between the lowest and highest frequencies of the pass band of a transmitter system including the network of FIG. 7. For example the frequency separation between the horns of response curves 50.9, 50.8, 50.7, and 50.6 are respectively 1.9 kHz, 1.6 kHz, 1.5 kHz and 1.2 kHz. In such situations differentiator 16 (FIG. 6) is employed.

Response curves 50.0-50.9 result from antenna system 920 having the component values discussed in connection with FIG. 2 and the sum of the inductances of coil 44 and inductors 955 and 956 being 901.94 microhenries. The inductance of inductor 943 is 821.5 microhenries, the inductance of the arm of phase shifter (i.e., low pass filter) 941 including inductor 943 is 845.5 microhenries when the 24.03 microhenry inductance at the output of transmitter 914, which is in series with inductor 943, is considered. Approximately half (i.e., 845.5 microhenries) of the 1684.78 microhenry inductance of inductor 944 can be considered as being in filter 941. Thus, the two series arms of filter 941 can be considered as containing the same values of inductance. In a somewhat similar manner, phase shifter (low pass filter) 942 has associated with it two inductive arms containing virtually the same amount of inductance. The inductance of the half of inductor 944 that is considered to be in filter 942 is 839.27 microhenries. The combined inductance of inductor 946 and coil 42 is 798.58 microhenries and the inductance of inductor 46 is 40.7 microhenries so the combined series inductance of inductors 966 and 46 and coil 42 is 739.28 microhenries. Thus, for design purposes, phase shifters 941 and 942 are similar to constant k, tee low pass filters.

If the coupling coefficient of variocoupler 40 is set to zero, resulting in the only coupling between primary circuit 961 and secondary circuit 963 being by shunt inductive coupling inductor 46, response curve 50.0 is applicable. The spacing between the horns of response curve 50.0 is about 600 Hz and the peak values of the horns are about 20 dB above the lowest value of curve 50.0. In contrast, if the coupling coefficient of variocoupler 40 is 0.40, resulting from the turns of coil 42 being turned about 40 degrees from the turns of coil 44, response curve 50.9 is applicable. The spacing between the horns of response curve 50.9 is about 1900 Hz and the peak values of the horns are about 33 dB above the lowest value of curve 50.9. Thus, if wide bandwidth is desired and the power of the signal transmitted from antenna system 920 is not particularly important, the variocoupler coupling coefficient should be set at about 0.4; if the opposite result is desired, the variocoupler coefficient should be set at or close to zero. If some compromise between these two situations is desired the variocoupler coupling coefficient should be set at some intermediate value. Changing the bandwidth and/or power requirements is performed by only changing the variocoupler coupling coefficient.

The matching network of FIG. 10 is the same as the network of FIG. 7, except that in the FIG. 10 network, inductor 46 is omitted and the ends of variocoupler coils 42 and 44, respectively opposite from terminals 948 and 954, are directly, (ohmically) connected to ground.

Figure 11:
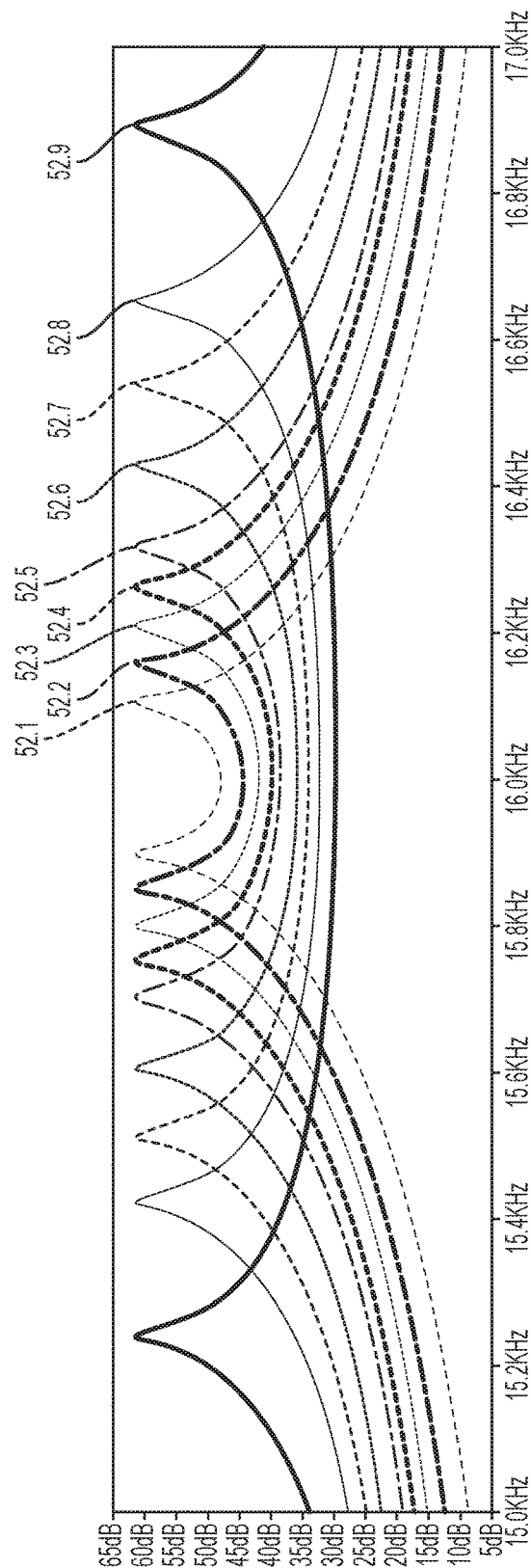
FIG. 11 includes a series of amplitude versus frequency response curves of the matching network of FIG. 10 for differing coupling coefficients of an air core transformer arrangement of FIG. 4.

FIG. 11 includes a series of amplitude (in dB) versus frequency response curves 52.1, 52.2, 52.3, 52.4, 52.5, 52.6, 52.7, 52.8, and 52.9 for different coupling coefficients of variocoupler 40 of FIG. 7; the variocoupler coefficients are respectively 0.05, 0.075, 0.1, 0, 125, 0.15, 0.2, 0.25, 0.3, and 0.4. Each of response curves 52.1-52.9 has a similar shape, including two equal amplitude horns (peak values) equidistant from a nadir of the response curve at the frequency of carrier source 916. As the values of the coupling coefficients increase, the separation between the horns of each response curve increases, with a corresponding increase in the bandwidth of the transmitter system. The frequency separations between the horns of many of the curves of FIG. 11 are such that the antenna system radiation resistance increases substantially between the lowest and highest frequencies of the pass band of a transmitter system including the network of FIG. 11. For example the frequency separation between the horns of response curves 52.9, 52.8, 52.7, and 52.6 are respectively about 1.7 kHz 1.3 kHz, 1.1 kHz and 0.9 kHz. In such situations differentiator 16 (FIG. 1) is employed.

The horns of response curves 50.9 and 52.9, (FIGS. 9 and 11) both of which are associated with 0.4 coupling coefficients, are respectively spaced from each other by about 1.9 kHz and 1.8 kHz and the nadir of each of response curves 50.9 and 52.9 from the peak values of the horns is about 33 dB. In contrast, the horns of response curves 50.2 and 52.1, both of which are associated with 0.05 coupling coefficients, are respectively spaced from each other by about 600 Hz and 200 Hz and the nadir of response curve 50.9 from the peak values of the horns is about 25 dB, while the nadir of response curve 52.1 from the peak values of the horns is about 14 dB. Consequentially, if greater bandwidth is required, the matching networks of FIGS. 7 and 10 provide about the same results, but if the ability to control bandwidth from a narrow to a wide range of frequencies is required, the matching network of FIG. 10 is preferred. The network of FIG. 10 has the advantage of fewer components and lower cost relative to the matching network of FIG. 7.

To obtain response curves 52.1-52.9, all of the impedances of the matching network of FIG. 10 have the same values as the corresponding impedances of FIG. 7, except the sum of the inductances of coil 42 and inductor 946 in the network of FIG. 10 is 839.28 microhenries and the sum of the inductances of coil 44 and inductors 955 and 956 equals 942.64 microhenries 44. Thus, phase shifters 941 and 942 of the matching network of FIG. 10 can both be considered as constant k low pass filters because both filters include two series inductors having the same inductance and a shunt capacitor between the series inductors.

An iterative procedure, with the aid of a network simulator of the matching network of FIG. 10, can be used to design the values of the components of the FIG. 10 matching network. The first step is to insert into the simulator: (1) the values of the distributed impedances of antenna system 920, (2) the types, locations and measured values of stray impedances of an actual matching network containing the components of FIG. 10, (3) the measured inductances of coils 42 and 44, (4) calculated values for the inductances of the inductors and the capacitances of the capacitors of phase shifters 941 and 942, based on the values of these components to achieve, in each of the phase shifters, a 90 degree phase shift at the carrier frequency of transmitter 914, (5) a nominal value for the inductance of inductor 956 based on the inductance of coil 44 and an expected value of the inductance of inductor 955, and (6) a value for the inductance of inductor 955 which results in secondary circuit 963 being resonant to the carrier frequency of transmitter 914.

The calculations of operation (4) are performed by assuming that the output terminal of each of phase shifters 941 and 942 is connected to a first terminal of a hypothetical resistor having a second terminal connected to ground. Such a resistor has a value equal to the characteristic impedance seen looking into the input terminals of the phase shifter. Because phase shifters 941 and 942 are 90 degree phase shifters and are configured as constant k, tee type low pass filters, the impedance magnitude of each arm of the filter equals the magnitude of the characteristic impedance of each phase shifter at the carrier frequency of transmitter 914. For instance, if the characteristic impedance of phase shifter 941 is 50 ohms, (a) the impedance of the arm including inductor 943 and the series impedance of transmitter 914 that is in series with inductor 943 is +j50 ohms, (b) the impedance of the arm including half of inductor 944 is +j50 ohms, and (c) the impedance of the arm including capacitor 945 is −j50 ohms.

The next step is to adjust the simulated coupling between coils 42 and 44 to produce the desired bandwidth of the matching network, as indicated by the spacing of the horns of the response curve. The simulated coupling is obtained by assuming that coils 42 and 44 are included in a transformer having a turns ratio to provide the desired load impedance to the transmitter. Then, the inductance of inductor 955 is adjusted so the impedance looking into the network at terminal 940 has zero reactance at the carrier frequency of transmitter 914, i.e., is resonant at the carrier frequency. The next step is to slightly adjust the values of the components of phase shifters 941 and 942 so the amplitudes of the horns of the response curve are approximately equal and/or symmetrical. This is done by slightly adjusting the characteristic impedance and center frequency of phase shifters 941 and 942. Then, the characteristic impedance looking into terminal 940 is adjusted to produce the impedance at channel center for which transmitter 914 is designed. The characteristic impedance is adjusted by changing the values of the components of phase shifters 941 and 942, including winding 42 of variocoupler 40, to provide a higher or lower characteristic impedance.

The foregoing steps are repeated in the simulator until the matching network has the desired: (1) input impedance, within 10%, at the carrier frequency of transmitter 914, and (2) bandwidth, within 10%. The operations on the simulator should be performed at a frequency within 1% of the expected frequency of transmitter 914.

The matching network of FIG. 12 includes electric link 56, such as a transmission line, between primary and secondary circuits 961 and 963 that are physically spaced from each other by a significant distance, because of the large physical size of components in circuits 961 and 963. The components of the primary and secondary circuits 961 and 963 of FIG. 12 have the same connections and values as the components of the primary and secondary circuits 961 and 963 of FIG. 10. Variocoupler coils 42 and 44 of the network of FIG. 12 are respectively connected to the primary and secondary circuits of FIG. 12 in the same manner that coils 42 and 44 are connected to the primary and secondary circuits of FIG. 10.

The network of FIG. 12 has an air core transformer arrangement including variocouplers 58 and 60, respectively including coils 42 and 44. Variocouplers 58 and 60 also respectively include coils 62 and 64 that are connected to opposite ends of link 56. As a result, the primary circuit 961 of FIG. 12 is magnetically (i.e., transformer) coupled to one end of link 56 by a first portion of an air core transformer arrangement and the secondary circuit 963 of FIG. 12 is magnetically coupled to the other end of link 56 by a second portion of the air core transformer arrangement.

Figure 13:
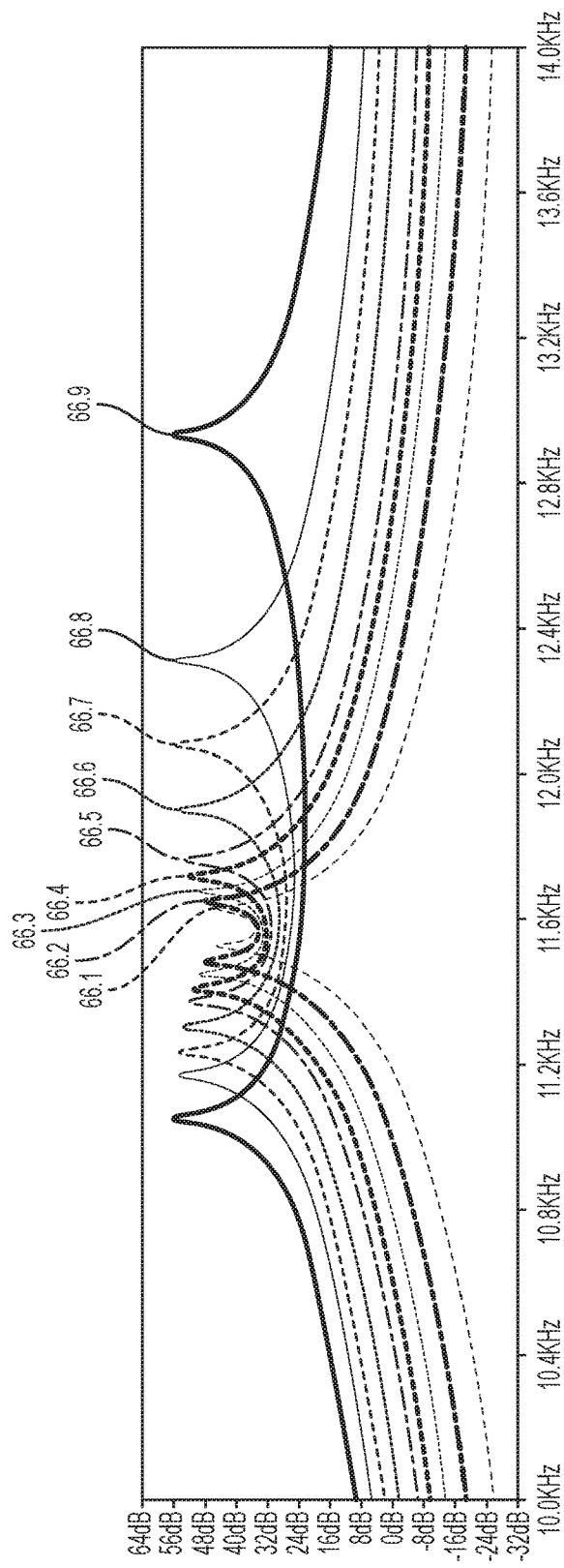
FIG. 13 includes a series of amplitude versus frequency response curves of the matching network of FIG. 12 for differing coupling coefficients of an air core transformer arrangement of FIG. 12.

FIG. 13 includes a series of amplitude (in dB) versus frequency response curves 66.1, 66.2, 66.3, 66.4, 66.5, 66.6, 66.7, 66.8, and 66.9 respectively associated with coupling coefficients 0.05, 0.1, 0.75, 0.125, 0.15, 0.2, 0.25, 0.3, and 0.4 of variocouplers 58 and 60 of FIG. 12. The turnable coils of variocouplers 58 and 60 are coupled to each other so that they both turn by approximately the same amount, causing the coupling coefficients of both variocouplers to be approximately the same. Curves 66.1-66.9 are based on: (1) the impedances of the primary and secondary circuits of the network of FIG. 12 being the same as those of FIG. 10, (2) each of coils 58 and 60 having an inductance of 100 microhenries, (3) the transmission line of link 56 having a delay time of 100 nanoseconds, and (4) the characteristic impedance of link 56 being 50 ohms.

Each of response curves 66.1-66.9 has a somewhat similar shape, including two equal amplitude horns (peak values) asymmetrically located from a nadir of the response curve displaced from the frequency of carrier source 916. As the values of the coupling coefficients increase, the separation between the horns of each response curve increases, with a corresponding increase in the bandwidth of the transmitter system. Thus, response curves 66.1-66.9 indicate there is interaction between changes in the coupling of variocouplers 58 and 60 and tuning the matching network of FIG. 12 to the carrier frequency of transmitter 914. This interaction can be mitigated by adjusting variable inductor 955 so secondary circuit 963 remains tuned to the transmitter carrier frequency as the variocoupler coupling coefficient is varied. The frequency separations between the horns of many of the curves of FIG. 13 are such that the antenna system radiation resistance increases substantially between the lowest and highest frequencies of the pass band of a transmitter system including the network of FIG. 12. For example the frequency separation between the horns of response curves 66.8, 66.7, and 66.6 are respectively 1.4 kHz, 1.15 kHz, and 0.7 kHz. In such situations differentiator 16 (FIG. 6) is employed.

FIGS. 14, 16, 18 and 20 include variations of impedance matching network 18. Each of the impedance matching networks of FIGS. 14, 16, 18 and 20 includes: (1) a primary circuit 68, that is resonant to the carrier frequency derived by carrier source 916 and is coupled with modulation to input terminal 70 of each of primary circuits 68, and (2) secondary circuit 72 that is resonant to the carrier frequency and includes antenna system 920. Circuits 68 and 72 respectively include variocoupler coils that are included in an air core transformer arrangement for providing magnetic coupling between circuits 68 and 72.

Figure 14:
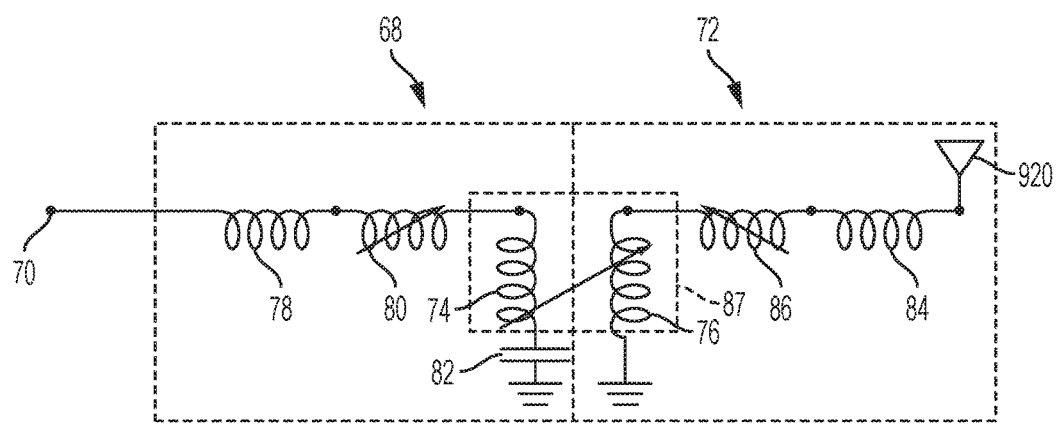
FIG. 14 is a circuit diagram of a fourth embodiment of a matching network according to the present invention, wherein the matching network is overcoupled and doubly tuned and includes a primary circuit with a series circuit resonant to the carrier frequency of the transmitter.
Figure 18:
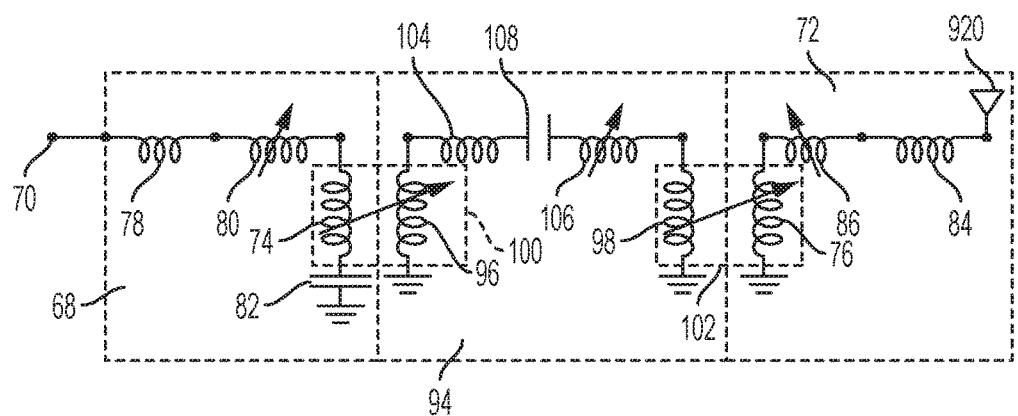
FIG. 18 is a circuit diagram of a sixth embodiment of a matching network according to the present invention, wherein the matching network is overcoupled and triply tuned and includes a primary circuit with a series circuit resonant to the carrier frequency of the transmitter.
Figure 20:
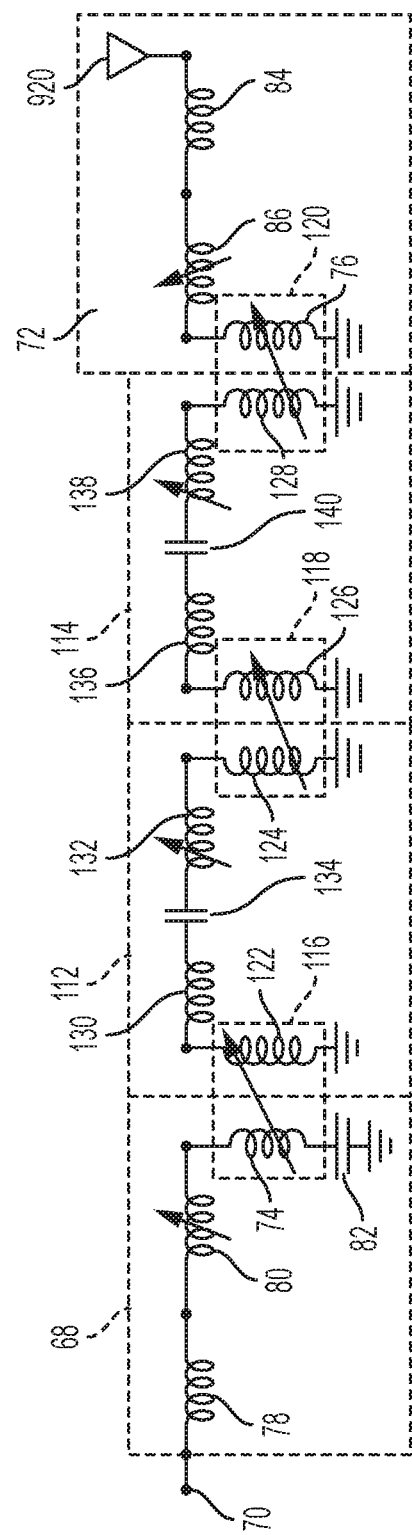
FIG. 20 is a circuit diagram of a seventh embodiment of the matching network according to the present invention, wherein the matching network is overcoupled and quadruply tuned and includes a primary circuit with a series circuit resonant to the carrier frequency of the transmitter.

Each primary circuit 68 of the matching networks of FIGS. 14, 18 and 20 includes fixed inductor 78, variable inductor 80, variocoupler coil 68 and fixed capacitor 82 that are connected in series with each other. The inductance of variable inductor 80 is adjusted so the combined inductive impedances of inductors 78 and 80 and coil 74, at the carrier frequency, is equal to the capacitive impedance of capacitor 82 at the carrier frequency, so primary circuit 68 is resonant at the carrier frequency. Input terminal 70 of the series connected primary circuits of FIGS. 14, 18 and 20 is connected directly to the output of Class D amplifier 917 of transmitter 914 if carrier source 916 is a sine wave oscillator. However, if source 916 derives a stair step approximation of a sine wave, the output of the Class D amplifier is supplied to a low pass filter having a cutoff frequency, such as 1 MHz, sufficient to remove harmonics associated with the steps.

Each secondary circuit 72 of the matching networks of FIGS. 14, 16, 18 and 20 includes fixed inductor 84, variable inductor 86, variocoupler coil 72 and antenna 920 all of which are connected in series with each other. The inductance of variable inductor 86 is adjusted so the combined inductive impedances of inductors 78 and 80 and coil 74, at the carrier frequency, is equal to the distributed capacitance of antenna 920 at the carrier frequency, so secondary circuit 72 is resonant at the carrier frequency.

In the overcoupled double tuned matching network of FIG. 14, an air core transformer arrangement consisting of coils 74 and 76 of variocoupler 87 magnetically couples voltage from primary circuit 68 to secondary circuit 72. The coupling coefficient of variocoupler 87 can be changed to alter the bandwidth of the matching network without changing the tuning between transmitter 914 and antenna system 920 and without changing any of the matching network impedances. However, as bandwidth is adjusted, the impedance presented to the transmitter at channel center changes. The impedance seen by the transmitter can be adjusted by changing the inductance to capacity ratio (L/C ratio) of the primary circuit (capacitor 82 and inductors 78, 80, and 74).

Figure 15:
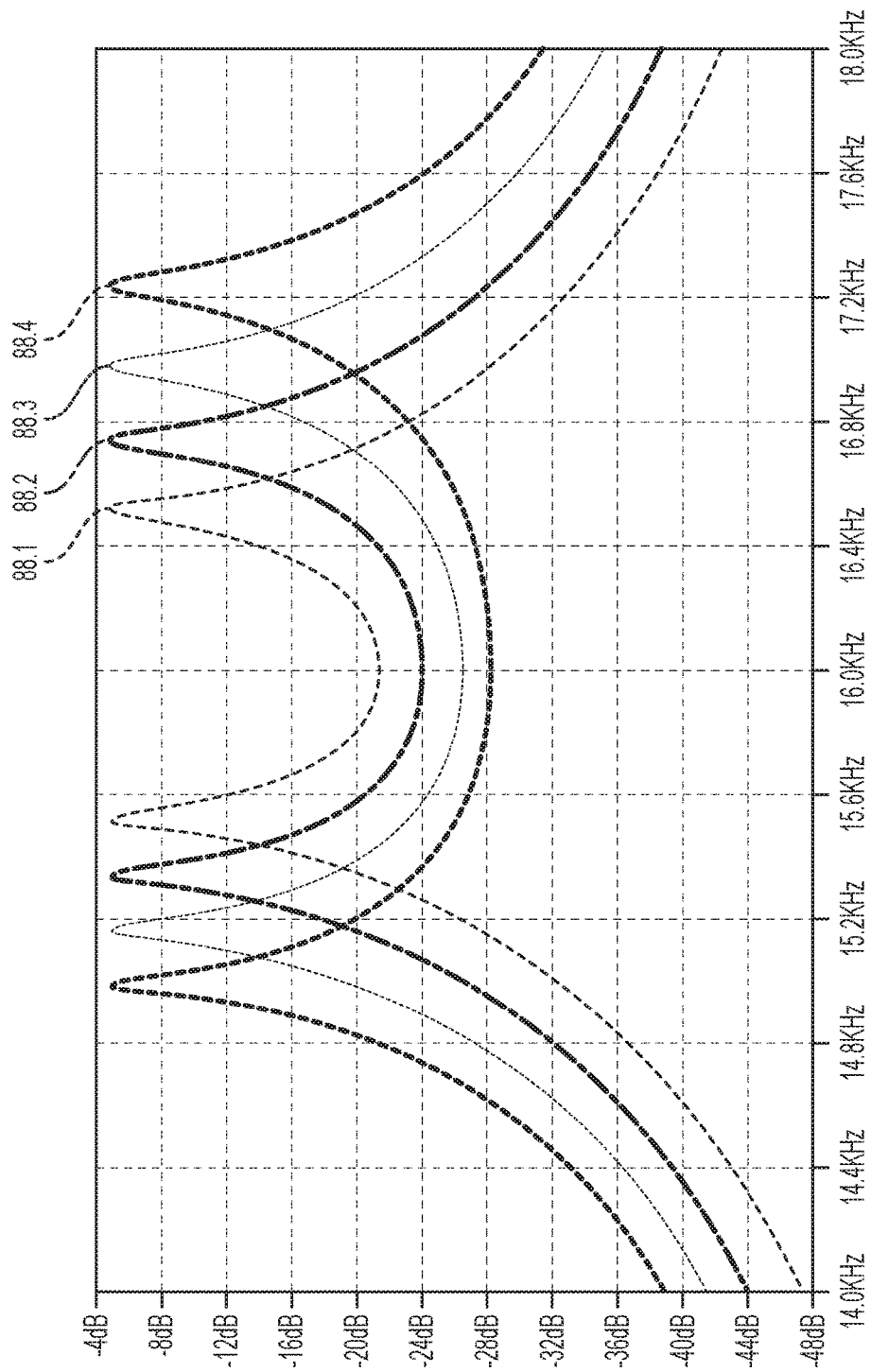
FIG. 15 includes a series of amplitude versus frequency response curves of the matching network of FIG. 14 for differing coupling coefficients of an air core transformer arrangement of FIG. 14, wherein the air core transformer arrangement couples the primary circuit to a secondary circuit of the matching network.

FIG. 15 includes a series of amplitude (in dB) versus frequency response curves 88.1, 88.2, 88.3, and 88.4 for different coupling coefficients of variocoupler 87 of FIG. 14; the variocoupler coefficients for curves 88.1, 88.2, 88.3 and 88.4 are respectively 0.25, 0.35, 0.45, and 0.55. Each of response curves 88.1-88.4 has the characteristic shape of an overcoupled double tuned circuit, including two equal amplitude horns (peak values) equidistant from a nadir of the response curve at the frequency of carrier source 916. As the values of the coupling coefficients increase, the separation between the horns of each response curve increases, with a corresponding increase in the bandwidth of the transmitter system.

Response curves 88.1-88.4 result from antenna system 920 having: a distributed capacitance of 92400 picofarads, a distributed inductance of 167.5 microhenries, a radiation resistance of 0.593 ohms, ground resistance of 0.05 ohms and other distrubuted resistances of 0.0634 ohms, as well as a bushing capacitance of 530 picofarads. Coil 76 and Inductors 84 and 86 have a combined inductance of 899.04 microhenries, causing secondary circuit 72 to be resonant at the carrier frequency of 16 kHz which transmitter 920 supplies to matching circuit 18. Primary circuit 68 is also resonant at the 16 kHz carrier frequency because the sum of the inductances of coil 74 and inductors 78 and 80 is 1091.27 microhenries and capacitor 82 has a capacitance of 90.67 nanofarads.

The spacing between the horns of response curve 88.1 is about 700 Hz and the peak values of the horns of curve 88.1 are about 16 dB above the lowest value of curve 92.1. In contrast, if the coupling coefficient of variocoupler 87 of the network of FIG. 14 is 0.55, resulting from the turns of coil 74 being turned approximately 45 degrees from the turns of coil 76, response curve 88.4 is applicable. The spacing between the horns of response curve 88.4 is about 2200 Hz and the peak values of the horns are about 23 dB above the lowest value of curve 92.5. Thus, if wide bandwidth is desired and the amount of power of the signal transmitted from antenna system 920 is not particularly important, the variocoupler coupling coefficient should be set at about 0.55; if the opposite result is desired, the variocoupler coupling coefficient should be set at or close to 0.25. If some compromise between these two situations is desired the variocoupler coupling coefficient should be set at some intermediate value. Changing the bandwidth and/or power requirements is performed by only changing the variocoupler coupling coefficient. The frequency separations between the horns of many of the curves of FIG. 15 are such that the antenna system radiation resistance increases substantially between the lowest and highest frequencies of the pass band of a transmitter system including the network of FIG. 14. For example the frequency separation between the horns of response curves 88.4, 88.3, 88.2 and 88.1 are respectively 2.2 kHz, 2.2 kHz, 1.5 kHz and 0.9 kHz. In such situations differentiator 16 (FIG. 1) is employed.

Figure 16:
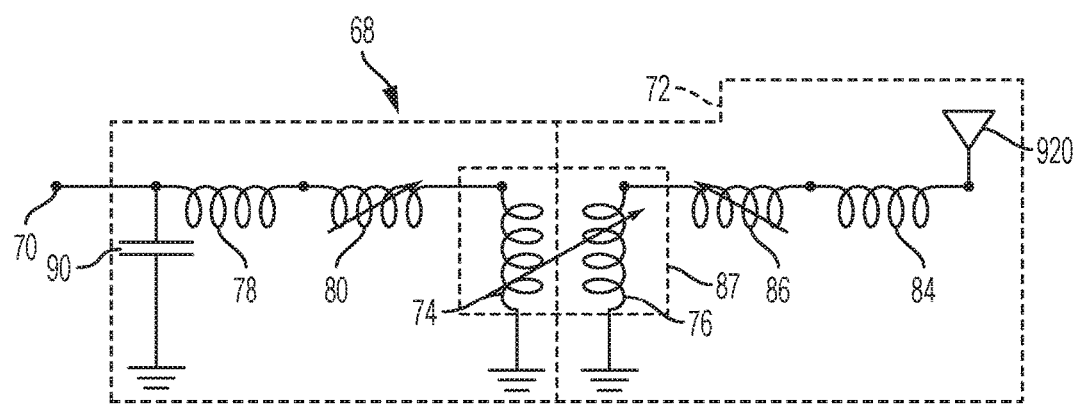
FIG. 16 is a circuit diagram of a fifth embodiment of the matching network according to the present invention, wherein the matching network is overcoupled and doubly tuned and includes a primary circuit with a parallel circuit resonant to the carrier frequency of the transmitter.

The matching network of FIG. 16 includes primary circuit 68 having a parallel circuit resonant to the carrier frequency that Class C amplifier 915 (a current source) of transmitter 914 supplies to input terminal 70 of the primary circuit. The parallel resonant circuit of primary circuit 68 includes a series circuit containing variocoupler coil 74, fixed inductor 78 and variable inductor 80, which series circuit is connected in parallel with capacitor 90. The impedance presented to transmitter 914 is the load impedance for which the transmitter is designed. The primary and secondary resonances are tuned to the 12 kHz carrier frequency associated with which the matching network of FIG. 16.ssociated.

Figure 3:
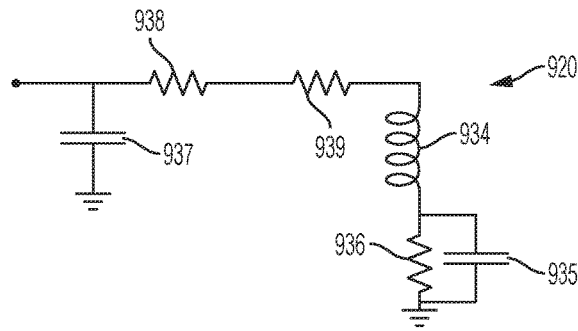

The matching network of FIG. 16 also includes secondary circuit 72, having the same configuration as the secondary circuit of FIG. 14, viz. variocoupler coil 76 in series with fixed inductor 84 and variable inductor 86 and antenna system 920. For analysis purposes the antenna system of the matching network of FIG. 16 is considered to have the parallel configuration and component values associated with and discussed in connection with the antenna system of FIG. 3. The inductance of inductor 86 is adjusted to achieve resonance of the secondary circuit of the matching network of FIG. 16 at the carrier frequency of transmitter 914.

Coils 74 and 76 of variocoupler 87 provide air core transformer, magnetic coupling between the primary and secondary circuits 68 and 72 of the matching network of FIG. 16, in the same manner as the coupling in the network of FIG. 14. To change the bandwidth of the network of FIG. 16, it is merely necessary to change the coupling coefficient of variocoupler 87. Changing the coupling coefficient of the variocoupler of FIG. 16 has no effect on the tuning of the network of FIG. 16. However, as bandwidth is adjusted, the impedance presented to the transmitter at channel center changes. The impedance seen by the transmitter is adjusted by changing the L/C ratio of the primary circuit (capacitor 90 and inductors 78, 80, and 74).

Figure 17:
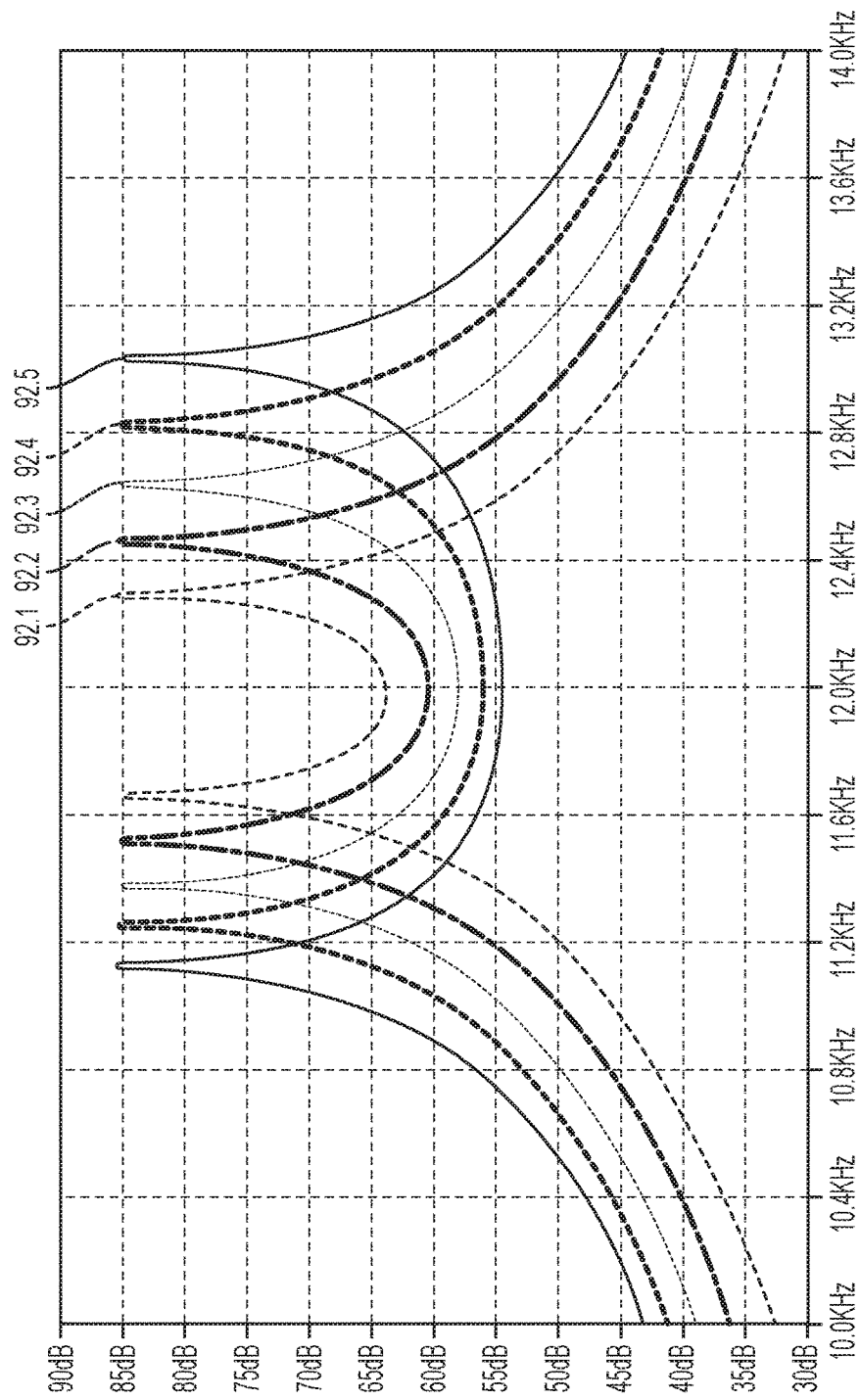
FIG. 17 includes a series of amplitude versus frequency response curves of the matching network of FIG. 16 for differing coupling coefficients of an air core transformer arrangement of FIG. 16, wherein the air core transformer arrangement couples the primary circuit to a secondary circuit of the matching network.

FIG. 17 includes a series of amplitude (in dB) versus frequency response curves 92.1, 92.2, 92.3, 92.4 and 92.5 for different coupling coefficients of variocoupler 87 of FIG. 16; the variocoupler coefficients are respectively 0.2, 0.3, 0.4, 0.5 and 0.6. Each of response curves 92.0-92.5 has the characteristic shape of an overcoupled double tuned circuit, including two equal amplitude horns (peak values) equidistant from a nadir of the response curve at the frequency of carrier source 916. As the values of the coupling coefficients increase, the separation between the horns of each response curve increases, with a corresponding increase in the bandwidth of the transmitter system.

Response curves 92.1-92.5, associated with the matching network of FIG. 16, result from: (1) capacitance 90 having a capacitance of 0.273 microfarads, (2) the sum of the inductances of coil 74 and inductors 78 and 80 being 1753.86 microhenries, (3) antenna system 920 having the component values discussed in connection with FIG. 3, (4) the sum of the inductances of coil 76 and inductors 84 and 86 being 1753.86 microhenries, and (5) the carrier frequency of transmitter 914 being 12 kHz.

The spacing between the horns of response curve 92.1 is about 550 Hz and the peak values of the horns of curve 92.1 are about 22 dB above the lowest value of curve 92.1. In contrast, if the coupling coefficient of variocoupler 87 of the network of FIG. 16 is 0.60, resulting from the turns of coil 74 being turned about 25 degrees from the turns of coil 44, response curve 92.5 is applicable. The spacing between the horns of response curve 92.5 is about 2 kHz and the peak values of the horns are about 35 dB above the lowest value of curve 92.5. Thus, if wide bandwidth is desired and the amount of power of the signal transmitted from antenna system 920 is not particularly important, the variocoupler coupling coefficient should be set at about 0.6; if the opposite result is desired, the variocoupler coupling coefficient should be set at or close to 0.2. If some compromise between these two situations is desired the variocoupler coupling coefficient should be set at some intermediate value. Changing the bandwidth and/or power requirements is performed by only changing the variocoupler coupling coefficient. The frequency separations between the horns of curves 92.2-92.5 of FIG. 17 are such that the antenna system radiation resistance increases substantially between the lowest and highest frequencies of the pass band of a transmitter system including the network of FIG. 16. For example the frequency separation between the horns of response curves 92.5, 92.4, 92.3, and 92.2 are respectively 2.0 kHz, 1.65, 1.2 and 0.9 kHz. In such situations differentiator 16 (FIG. 6) is employed.

The overcoupled triply tuned and quadruply tuned matching networks of FIGS. 18 and 20 include primary and secondary circuits that have the same configurations as primary circuit 68 and secondary circuit 72 of FIG. 14. However, the air core transformer magnetic coupling between the primary and secondary circuits of FIGS. 18 and 20 differs considerably from that of the network of FIG. 14. The networks of FIGS. 18 and 20 are associated with transmitters having a 12 kHz carrier frequency so that the component values of primary and secondary circuits 68 and 72 of the networks of FIGS. 18 and 20 differ from those of FIG. 14. The component values of corresponding components of FIGS. 18 and 20 are the same.

Circuit 94, resonant to the 12 kHz carrier frequency, couples primary circuit 68 of the network of FIG. 18 to secondary circuit 72 of the network of FIG. 18. Circuit 94 includes coils 96 and 98, respectively parts of variocouplers 100 and 102. A series circuit including fixed inductor 104, variable inductor 106 and capacitor 108 connects coils 96 and 98 to each other. Variocouplers 100 and 102 provide an air core transformer magnetic coupling arrangement between primary and secondary circuits 68 and 72. Coupling between primary and secondary circuits 68 and 72 is varied by turning inner variocoupler coils 74 and 98 by approximately the same amount relative to outer variocoupler coils 96 and 76 so that variocouplers 100 and 102 provide approximately the same coupling.

Figure 19:
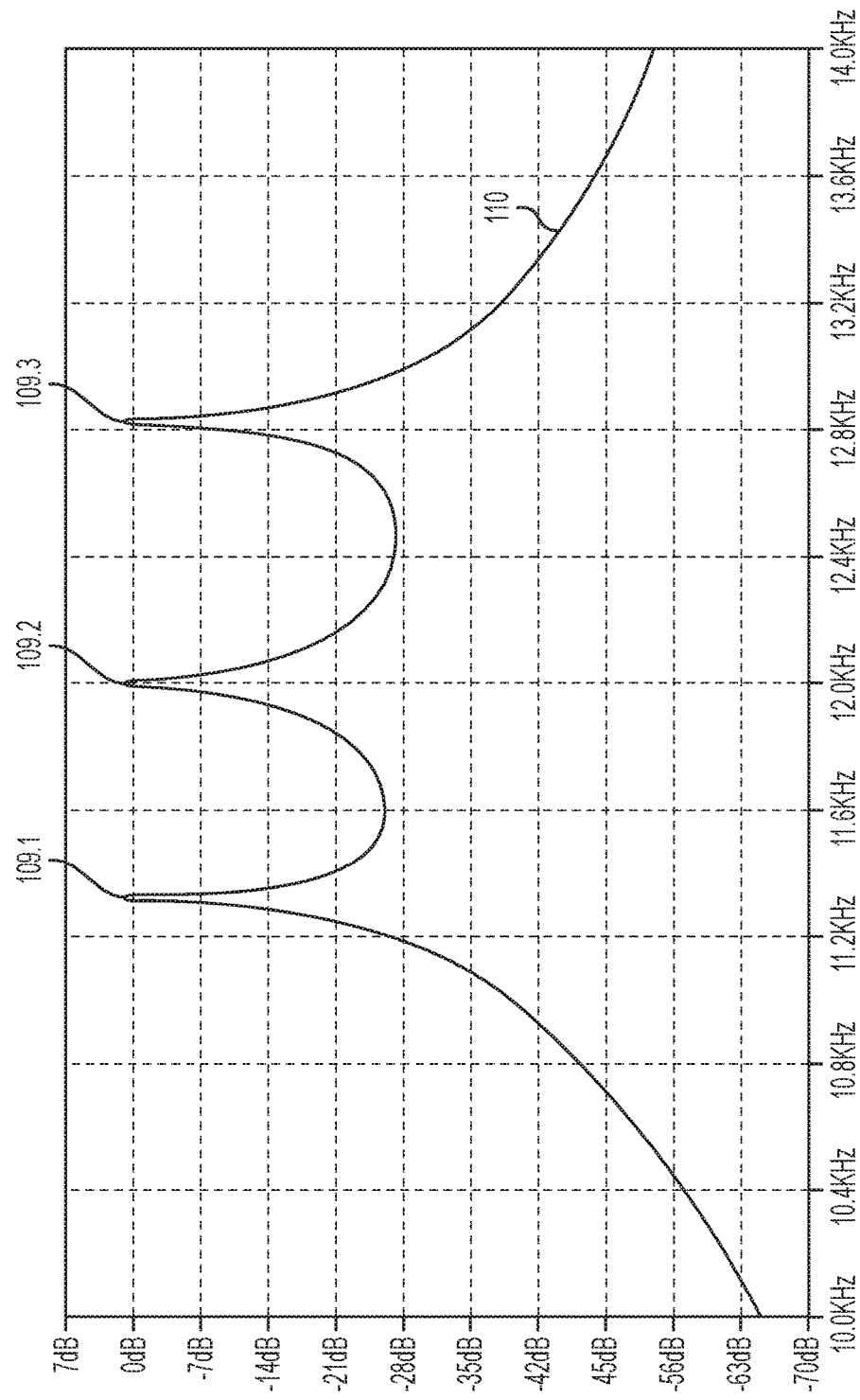
FIG. 19 includes an amplitude versus frequency response curve of the matching network of FIG. 18.

The magnitude of the impedances of series connected coils 96, 98 and inductors 104 and 106 equals the magnitude of the impedance of capacitor 108 at the carrier frequency supplied to terminal 70 so circuit 94 is resonant to the carrier frequency. Thus, the network of FIG. 18 includes three circuits 68, 72 and 94 resonant to the carrier frequency applied to terminal 70, resulting in three horns 109.1, 109.2 and 109.3 in response curve 110 of FIG. 19. The peak value of center horn 109.2 is at the carrier frequency of 12 kHz, while the peak value of low frequency horn 109.1 is about 11.25 kHz and the peak value of high frequency horn 109.3 is about 12.8 kHz. The peak values of horns 109.1, 109.2 and 109.3 are approximately equal and are about 28 dB above the lowest voltage levels between the horns. The frequencies between adjacent pairs of horns 109.1, 109.2 and 109.3 can provide two different communication channels of a transmitter system including the matching network of FIG. 18. Or, if the center horn ids amplitude equalized, one wide band channel can be transmitted. The frequency spread between horns 109.1 and 109.3 is 1.5 kHz so that differentiator 16 is employed with a matching network having response curve 110.

Response curve 110 results from the antenna system 920 associated with the network of FIG. 18 having: a distributed capacitance of 89400 picofarads, a distributed inductance of 297.2 microhenries, a radiation resistance of 0.435 ohms, ground resistance of 0.03 ohms and other distrusted resistances of 0.1 ohms, as well as a bushing capacitance of 440 picofarads. Coil 76 and Inductors 84 and 86 have a combined inductance of 1663.63 microhenries, causing secondary circuit 72 to be resonant at the carrier frequency of 12 kHz which transmitter 920 supplies to terminal 70 of FIG. 18. Primary circuit 68 is also resonant at the 12 kHz carrier frequency because the sum of the inductances of coil 74 and inductors 78 and 80 is 761.33 microhenries and capacitor 82 has a capacitance of 0.231 microfarads. Coupling circuit 94 is resonant to 12 kHz because the sum of the inductances of coils 96 and 98 and inductors 104 and 106 is 761.3 microhenries, and the capacitance of capacitor 108 is 0.231 microfarads.

Circuit 94, resonant to the 12 kHz carrier frequency, couples primary circuit 68 of the network of FIG. 18 to secondary circuit 72 of the network. Circuit 94 is a series resonant circuit including coils 96 and 98, (respectively parts of variocouplers 100 and 102) as well as fixed inductor 104, variable inductor 106 and capacitor 108 that connect coils 96 and 98 to each other.

Variocouplers 100 and 102 provide an air core transformer magnetic coupling arrangement between primary and secondary circuits 68 and 72 of the network of FIG. 18. Coupling between primary and secondary circuits 68 and 72 is varied by turning inner variocoupler coils 74, and 98 by approximately the same amount relative to outer variocoupler coils 96, and 76, i.e., by approximately synchronous changes of the coupling coefficients of variocouplers 100 and 102. Center horn 109.2 of response curve 110 remains at the carrier frequency as the coupling coefficient changes because of the approximately synchronous changes of variocouplers 100 and 102.

The coupling coefficients of variocouplers 100 and 102 increase in response to the windings of coils 74, and 96 respectively approximately synchronously moving toward parallelism with the windings of coils 76, and 98 and vice versa for decreasing coupling coefficients. The approximately synchronous changes in the coupling coefficients of variocouplers 100 and 102 cause changes in the spacing between horns 109.1, 109.2 and 109.3 and the bandwidths of the previously mentioned different transmission channels of the transmitter system including the matching network of FIG. 18. The bandwidth changes are made without affecting the tuning properties of the matching network of FIG. 18. However, as bandwidth is adjusted, the impedance presented to the transmitter at channel center changes. The impedance seen by the transmitter can be adjusted by changing the L/C ratio of the primary circuit.

The quadruply tuned matching network of FIG. 20 includes primary circuit 68, secondary circuit 72, and coupling circuits 112 and 114, all of which are resonant at the 12 kHz carrier that transmitter 914 applies to input terminal 70 of the network of FIG. 20. The primary and secondary circuits 68 and 72 (including antenna system 920) of the network of FIG. 20 are identical in configuration and component values to the corresponding circuits of FIG. 18. Coupling circuits 112 and 114 have the same configuration and component values as coupling circuit 94 of FIG. 18.

The network of FIG. 20 includes an air core transformer magnetic coupling arrangement comprising variocouplers 116, 118 and 120. Variocoupler 116 includes coil 74 of primary circuit 68 and coil 122 of coupler circuit 112; variocoupler 118 includes coils 124 and 126, respectively included in coupler circuits 112 and 114; and variocoupler 120 includes coils 76 and 128, respectively included in secondary circuit 72 and coupling circuit 114. Coupling circuit 112 includes fixed and variable inductors 130 and 132, connected in series with each other and capacitor 134, between coils 122 and 124. Coupling circuit 114 includes fixed and variable inductors 136 and 138, connected in series with each other and capacitor 140, between coils 126 and 128. Corresponding components of: (1) primary circuits 68 of FIGS. 18 and 20, (2) secondary circuits 72 (including antenna system 920) of FIGS. 18 and 20 and (3) coupling circuits 94, 112 and 114 have the same values.

Figure 21:
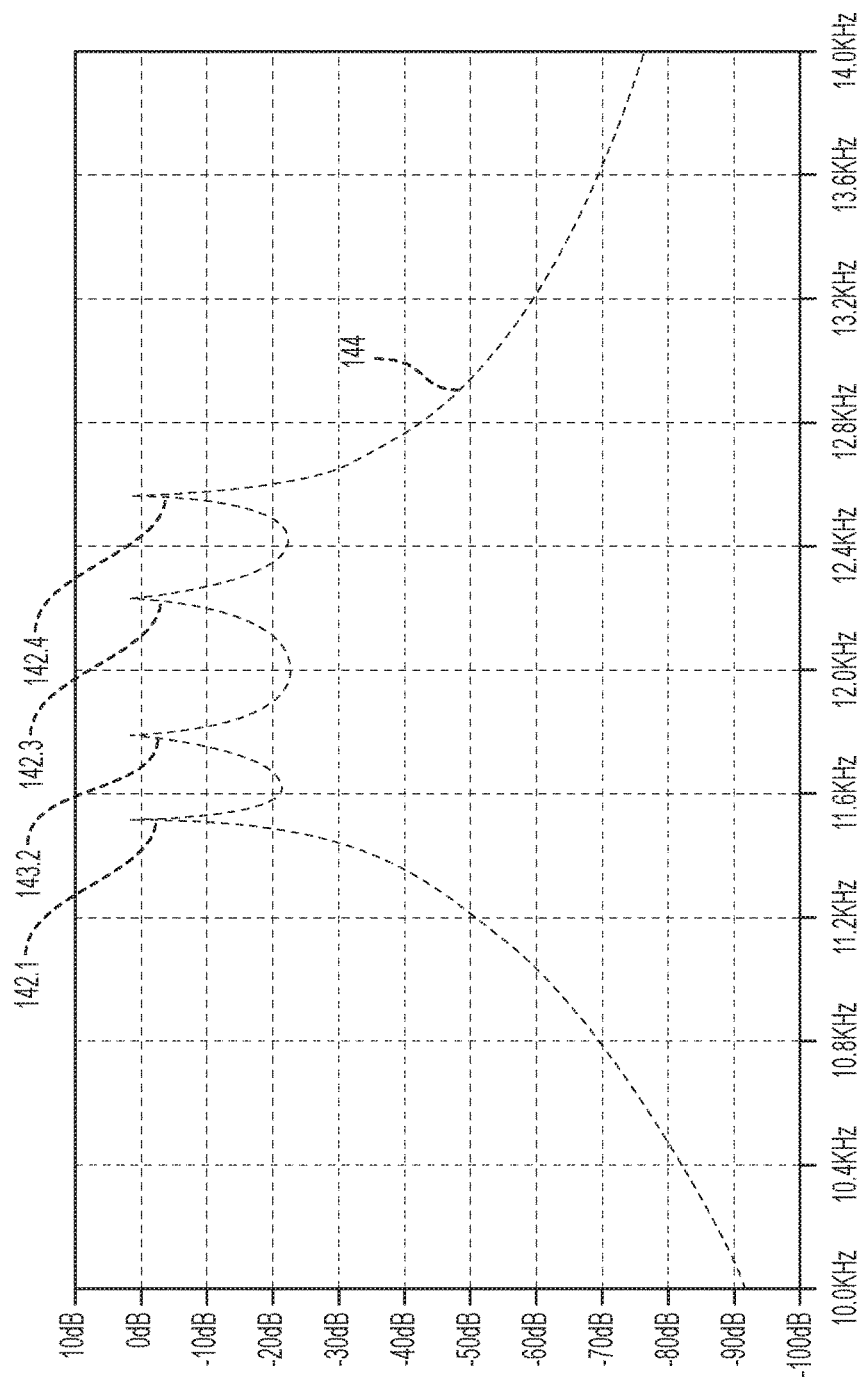
FIG. 21 includes an amplitude versus frequency response curve of the matching network of FIG. 20.

Thus, the network of FIG. 20 includes four circuits 68, 72, 112 and 114 resonant to the 12 kHz carrier frequency applied to terminal 70. Under these conditions, the network of FIG. 20 has the amplitude versus frequency response curve 144 of FIG. 21. Response curve 144 has four horns 142.1, 142.2, 142.3 and 142.4 having peak values at about 11.5 kHz, 11.75 kHz, 12.3 kHz and 12.575 kHz, whereby the peak values of horns 142.2 and 142.3 are approximately symmetrically spaced from the 12 kHz carrier frequency and the peak values of horns 142.1 and 142.4 are approximately symmetrically spaced from the carrier frequency. The peak values of horns 142.1, 142.2, 142.3 and 142.4 are approximately equal and are about 23 dB above the three lowest voltage levels between the horns. One of the three lowest voltage levels is at the carrier frequency of 12 kHz. The frequencies between adjacent pairs of horns 142.1, 142.2, 142.3 and 142.4 can provide three different communication channels or if the inner horns are amplitude equalized, one wide bandwidth channel of a transmitter system including the matching network of FIG. 20. The 1.09 kHz frequency spread between horns 142.1 and 142.4 requires the use of differentiator 16 of FIG. 6.

Variocouplers 116, 118, and 120 provide an air core transformer magnetic coupling arrangement between primary and secondary circuits 68 and 72 of the network of FIG. 20. Coupling between primary and secondary circuits 68 and 72 is varied by turning inner variocoupler coils 74, 124 and 128 by approximately the same amount relative to outer variocoupler coils 122, 126 and 76, i.e., by approximately synchronous changes of the coupling coefficients of variocouplers 116, 118 and 120 so each of the variocouplers provides approximately the same amount of coupling. The minimum voltage of response curve 144 remains at the carrier frequency as the coupling coefficient changes because of the approximately synchronous movements of variocouplers 116, 118 and 120.

The coupling coefficients of variocouplers 116, 118 and 120 increase in response to the windings of coils 74, 124 and 96 approximately synchronously moving toward parallelism with the windings of coils 76, 126 and 98 and vice versa for decreasing coupling coefficients. The approximately synchronous changes in the coupling coefficients of variocouplers 116, 118 and 120 result in changes of the spacing between horns 142.1 142.2, 142.3 and 142.4, and the bandwidths of the previously mentioned different transmission channels of the transmitter system including the matching network of FIG. 20. The bandwidth changes are made without affecting the tuning properties of the matching network of FIG. 20. However, as bandwidth is adjusted, the impedance presented to the transmitter at channel center changes. The impedance seen by the transmitter can be adjusted by changing the L/C ratio of the primary circuit.

Figure 22:
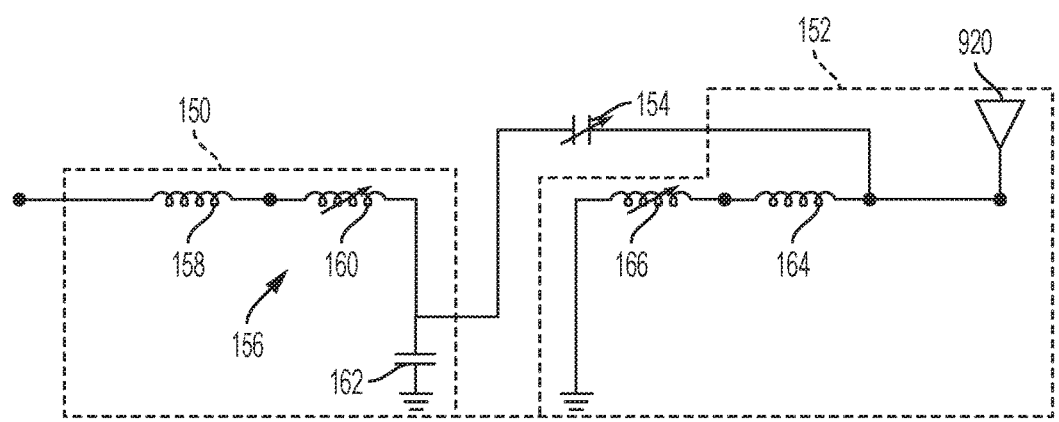
FIG. 22 is a circuit diagram of an eighth embodiment of a matching network according to the present invention, wherein the matching network is overcoupled and doubly tuned and includes a primary circuit with a series circuit resonant to the carrier frequency of the transmitter, wherein the primary circuit is capacitively coupled to a secondary circuit of the matching network.

FIG. 22 is a circuit diagram of a matching network including primary circuit 150, secondary circuit 152 and variable coupling capacitor 154 that couples voltages and currents between circuits 150 and 152. Circuit 150 is responsive to a modulated carrier having a frequency of 12 kHz derived from Class D amplifier 917 of transmitter 914. The modulated carrier is applied to series circuit 156 of circuit 150 that includes fixed inductor 158, variable inductor 160 (having a fixed resistance) and fixed capacitor 162. The inductance of inductor 160 is adjusted so that circuit 156 is resonant to the carrier frequency applied to circuit 150.

Figure 2:
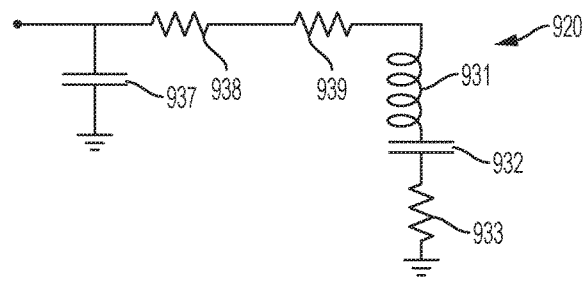
FIGS. 2 and 3, as previously described, are equivalent circuit diagrams of antenna systems employed in the prior art and the transmitter of the present invention, assuming that the antenna distributed impedances are respectively connected in series and parallel.

Secondary circuit 152 includes antenna system 920 which is assumed to be configured as set forth in FIG. 2 and therefor includes distributed capacitance represented, in FIG. 2, by series capacitor 932. Antenna 920 is in series with fixed inductor 164 and variable inductor 166, having a fixed resistance. Inductor 166 is adjusted so that the series circuit including antenna system 920 is resonant to the carrier frequency of the signal applied to primary circuit 150.

One electrode of coupling capacitor 154 is connected between inductor 160 and capacitor 162 of primary circuit 156 and the other electrode of capacitor 154 is connected between inductor 156 and antenna system 920. The capacitance of capacitor 154 is adjustable to provide differing capacitive coupling coefficients between primary and secondary circuits 150 and 152. The magnitude of the capacitive coupling coefficient equals the capacitance of capacitor 154 divided by the square root of the product of the capacitances of capacitor 162 and the distributed capacitance of antenna system 920 of FIG. 2, as represented, in FIG. 2, by capacitor 932.

Figure 23:
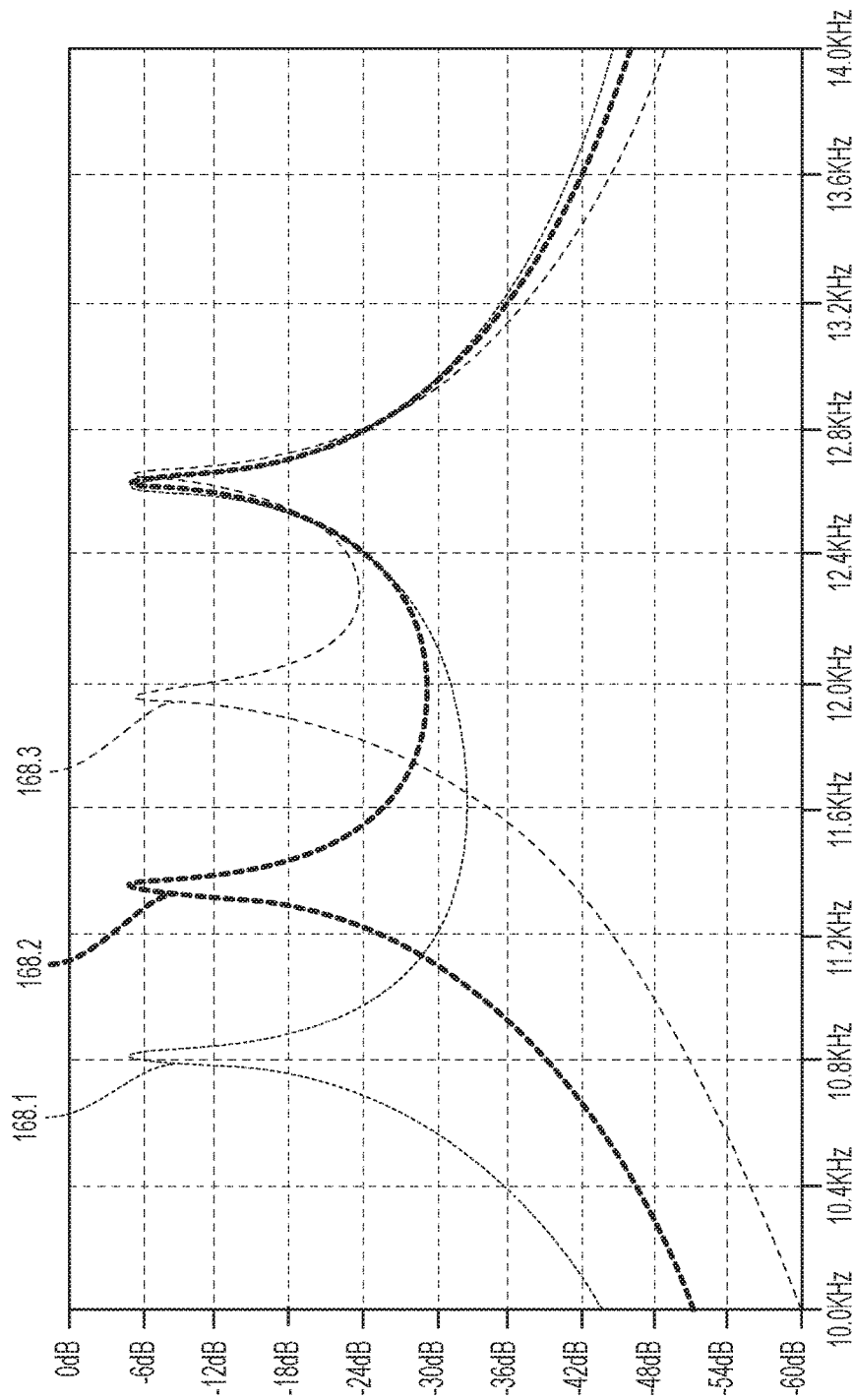
FIG. 23 includes a series of amplitude versus frequency response curves of the matching network of FIG. 22 for differing coupling coefficients of the matching network of FIG. 22.

Response curves 168.1, 168.2 and 168.3 of FIG. 23 indicate the voltage (in dB) versus frequency responses of the matching network of FIG. 22 for three different capacitive coupling coefficients, resulting from (1) a signal having a 12 kHz carrier being applied to circuit 150, (2) three different values of capacitance of coupling capacitor 154 and (3) no other changes of the component values of the network of FIG. 22. Response curve 168.1 is based on capacitor 154 having a capacitance of 20 nanofarads, which is associated with a coupling coefficient of 0.45, when the other components of FIG. 22 are considered. The values of the components (other than capacitor 154) to achieve response curves 168.1, 168.2 and 168.3 are: (1) the sum of the inductances of inductors 158 and 160 is 643.5 microhenries, (2) the capacitance of capacitor 162 is 0.2534 microfarads, (3) the sum of the inductances of inductors 164 and 166 is 1476.8 microhenries, (4) the ground loss associated with the antenna system is 0.077 ohms, (5) the other resistances of the antenna system have a value of 0.065 ohms, (6) the antenna system capacitance is 92400 picofarads, (7) the antenna system inductance is 167.5 microhenries, (8) the antenna system radiation resistance is 0.34 ohms, and (9) the bushing capacitance is 530 picofarads.

Response curves 168.1, 168.2 and 168.3 are quite different from each other in shape, center frequency and spacing between the two horns thereof. Response curves 186.1, 168.2 and 168.3 indicate changing the capacitive coupling of the network of FIG. 22 significantly detunes the matching network. To keep the center frequency of the network of FIG. 22 constant, the components of the network of FIG. 22 must be altered after the capacitive coupling coefficient has been changed. As before, the impedance seen by the transmitter at channel center also changes as coupling capacitance changes Thus, the bandwidth of a transmitter system including the network of FIG. 22 is not easily changed. If bandwidth changes are likely to be infrequent, the network of FIG. 22 can have the advantage of wide bandwidth. The horns of: (1) response curve 168.1 are spaced from each other by about 1.9 kHz, (2) response curve 168.2 are spaced rom each other by about 1.2 kHz, and (3) response curve 168.3 by about 0.65 kHz.

The coupling coefficients of the network of FIG. 22 associated with response curves 168.1 and 168.2 provide the matching network of FIG. 22 and the transmitter system including it with bandwidths wide enough to require use of differentiator 16 of FIG. 6. However, the frequency separation of 0.65 kHz of the horns of curve 168.3 is not sufficient to require use of differentiator 16. In general, differentiator 16 is employed if there is a frequency separation of at least 0.75 kHz between the horns of a response curve of an associated matching network having only two horns or between the outer horns of a response curve having more than two horns.

While there have been described and illustrated specific embodiments of the invention, it will be clear that variations in the details of the embodiments specifically illustrated and described can be made without departing from the true spirit and scope of the invention as defined in the appended claims.

I claim:

1. A method of modifying a matching network of a VLF or LF transmitter system having a transmitter for deriving a modulated carrier wave, the carrier wave having a VLF or LF frequency; the matching network having: (a) a primary circuit connected to be responsive to the modulated carrier wave, the primary circuit including first and second cascaded 90 degree phase shifters at the carrier frequency, the first phase shifter being connected to be responsive to the modulated carrier wave derived by the transmitter and connected to drive the second phase shifter, a first series inductor responsive to current flowing in the second phase shifter; (b) a secondary circuit resonant to the carrier frequency, the secondary circuit including (i) an antenna system that is electrically short at the carrier wave frequency, and (ii) an inductor arrangement connected between (1) a terminal responsive to the modulated carrier as derived from the primary circuit and (2) the antenna system, the inductor arrangement including a second series inductor; and (c) a coupling arrangement for the primary circuit to the secondary circuit; the method comprising: magnetically coupling the primary circuit to the secondary circuit via an air core transformer arrangement having (a) as its first coil the first series inductor and (b) as its second coil the second series inductor, modifying magnetic coupling of the first series inductor to the secondary circuit without having an effect on the resistance or inductance of the first series inductor; and modifying magnetic coupling of the inductor arrangement to the primary circuit without having an effect on the resistance or inductance of the inductor arrangement.

2. The method of claim 1 further including connecting the first and second coils in such a manner that some of the current that flows through the second coil flows in series through the first coil.

3. The method of claim 1 wherein a shunt coupling inductor is initially connected to the primary and secondary circuits; the method further including removing the shunt coupling inductor from the network so the first and second coils are not ohmically connected.

4. The method of claim 1 further including physically spacing the first and second coils from each other and electrically coupling them to each other via a link including third and fourth transformer coils connected to each other by the link, the link extending between the third and fourth coils, the first and third coils being included in a first air core transformer that magnetically couples the first and third coils, the fourth and second coils being included in a second air core transformer that magnetically couples the fourth and second coils, the first and second transformers being included in the transformer arrangement.

5. The method of claim 1, wherein the method is performed on an existing VLF or LF transmitter system that has been previously in operation to cause the bandwidth of the transmitter system to be increased.

6. A method of modifying a matching network of a VLF or LF transmitter system having a transmitter for deriving a modulated carrier wave, the carrier wave having a VLF or LF frequency; the matching network having: (a) a primary circuit connected to be responsive to the modulated carrier wave, the primary circuit including a low pass filter for passing the carrier wave frequency, the low pass filter being connected to be responsive to the modulated carrier wave derived by the transmitter and includes a first series inductor that is driven by the carrier wave; (b) a secondary circuit resonant to the carrier frequency, the secondary circuit including (i) an antenna system that is electrically short at the carrier wave frequency and is driven by the modulated carrier wave and (ii) an inductor arrangement connected between (1) a terminal responsive to the modulated carrier wave derived from the primary circuit and (2) the antenna system, the inductor arrangement including a second series inductor; and (c) a coupling arrangement for coupling the primary circuit to the secondary circuit; the method comprising: magnetically coupling the primary circuit to the secondary circuit via an air core transformer arrangement having (a) as its first coil the first series inductor and (b) as its second coil the second series inductor; modifying magnetic coupling of the first series inductor to the secondary circuit without having an effect on the resistance or inductance of the first series inductor; and modifying magnetic coupling of the inductor arrangement to the primary circuit without having an effect on the resistance or inductance of the inductor arrangement.

7. The method of claim 6 further including connecting the first and second coils in such a manner that some of the current that flows through the second coil flows in series through the first coil.

8. The method of claim 6 wherein the coupling arrangement initially includes a shunt coupling inductor connected to the primary and secondary circuits, and further including removing the shunt coupling inductor from the network so the first and second coils are not ohmically connected.

9. The method of claim 6 further including physically spacing the first and second coils from each other and electrically coupling them to each other via a link including third and fourth transformer coils connected to each other by the link, the link extending between the third and fourth coils, the first and third coils being included in a first air core transformer that magnetically couples the first and third coils, the fourth and second coils being included in a second air core transformer that magnetically couples the fourth and second coils, the first and second transformers being included in the transformer arrangement.

10. The method of claim 6, wherein the method is performed on an existing VLF or LF transmitter system that has been previously in operation to cause the bandwidth of the transmitter system to be increased.

11. A method of modifying a matching network of a VLF or LF transmitter system having a transmitter for deriving a carrier frequency adapted to be modulated; the matching network having: (a) a primary circuit connected to be responsive to the modulated carrier frequency, the primary circuit including first and second cascaded 90 degree phase shifters at the carrier frequency, the first phase shifter being connected to be responsive to the transmitter and connected to drive the second phase shifter, the second phase shifter including a first series inductor; (b) a secondary circuit resonant to the carrier frequency, the secondary circuit including an electrically short antenna system and an inductor arrangement connected between the primary circuit and the antenna system, the inductor arrangement including a second series inductor; and (c) coupling of the primary circuit to the secondary circuit by a shunt coupling inductor connected between the primary and secondary circuits; the method comprising: magnetically coupling the primary circuit to the secondary circuit via an air core transformer arrangement having a first coil that is included in the primary circuit and a second coil that is included in the secondary circuit; the first coil being included in the primary circuit by modifying the first series inductor; the second coil being included in the secondary circuit by modifying the inductor arrangement, the method further including removing the shunt coupling inductor from the network so the first and second coils are not ohmically connected.

12. The method of claim 2, wherein the method is performed on an existing VLF or LF transmitter system that has been previously in operation to cause the bandwidth of the transmitter system to be increased.

13. The method of claim 3, wherein the method is performed on an existing VLF or LF transmitter system that has been previously in operation to cause the bandwidth of the transmitter system to be increased.

14. The method of claim 4, wherein the method is performed on an existing VLF or LF transmitter system that has been previously in operation to cause the bandwidth of the transmitter system to be increased.

15. The method of claim 7, wherein the method is performed on an existing VLF or LF transmitter system that has been previously in operation to cause the bandwidth of the transmitter system to be increased.

16. The method of claim 8, wherein the method is performed on an existing VLF or LF transmitter system that has been previously in operation to cause the bandwidth of the transmitter system to be increased.

17. The method of claim 9, wherein the method is performed on an existing VLF or LF transmitter system that has been previously in operation to cause the bandwidth of the transmitter system to be increased.

\* \* \* \* \*